(12) United States Patent
Okai et al.

(10) Patent No.: US 12,161,520 B2
(45) Date of Patent: Dec. 10, 2024

(54) ORAL CARE APPARATUS

(71) Applicant: Colgate-Palmolive Company, New York, NY (US)

(72) Inventors: Takahide Okai, Highland Park, NJ (US); Thuan Chong Tan, Shanghai (CN); Mickael Norbert Bouffaut, Tung Chung (HK)

(73) Assignee: Colgate-Palmolive Company, New York, NY (US)

( * ) Notice: Subject to any disclaimer, the term of this patent is extended or adjusted under 35 U.S.C. 154(b) by 545 days.

(21) Appl. No.: 17/473,376

(22) Filed: Sep. 13, 2021

(65) Prior Publication Data

US 2021/0401558 A1 Dec. 30, 2021

Related U.S. Application Data

(63) Continuation of application No. 16/190,697, filed on Nov. 14, 2018, now Pat. No. 11,141,252.

(30) Foreign Application Priority Data

Nov. 17, 2017 (CN) .......................... 201711155369.X

(51) Int. Cl.
*A61C 17/22* (2006.01)
*A46B 9/04* (2006.01)
(Continued)

(52) U.S. Cl.
CPC ................ *A61C 17/22* (2013.01); *A46B 9/04* (2013.01); *A46B 13/02* (2013.01);
(Continued)

(58) Field of Classification Search
CPC ............ A46B 15/0002; A46B 15/0006; A46B 15/0016; A46B 15/0038; A61C 17/222; A61C 17/225
See application file for complete search history.

(56) References Cited

U.S. PATENT DOCUMENTS 6,920,659 B2 7/2005 Cacka et al.
7,143,462 B2 12/2006 Hohlbein
(Continued)

FOREIGN PATENT DOCUMENTS

CN 103876850 6/2014
CN 205338084 6/2016
(Continued)

OTHER PUBLICATIONS

KR 101774403 B1; Sep. 5, 2017; Kim Hyung Joo.*
(Continued)

*Primary Examiner* — Randall E Chin

(57) ABSTRACT

An oral care apparatus that includes an oral care implement and a tracking module detachably coupled to the oral care implement. The oral care implement includes a body having an inner surface that defines an internal cavity. The tracking module may be coupled to the oral care implement by inserting a portion of the tracking module into the internal cavity of the body. The tracking module includes a coupling portion and an electronics portion that are coupled together so as to be fixed together in the axial direction but freely rotatable relative to one another. The tracking module may only be able to be inserted into the internal cavity of the body in a single orientation. Furthermore, when in the internal cavity, the electronics portion of the tracking module may be non-rotatable relative to the body while the coupling portion of the tracking module remains rotatable relative to the body.

18 Claims, 19 Drawing Sheets

(51) Int. Cl.
*A46B 13/02* (2006.01)
*A46B 15/00* (2006.01)
*A46D 99/00* (2006.01)

(52) U.S. Cl.
CPC ...... *A46B 15/0006* (2013.01); *A46B 15/0016* (2013.01); *A46D 99/00* (2013.01); *A61C 17/225* (2013.01); *A46B 2200/1066* (2013.01)

(56) References Cited

U.S. PATENT DOCUMENTS

| | | | |
|---|---|---|---|
| 7,845,041 | B2 | 12/2010 | Gatzemeyer et al. |
| 8,225,449 | B2 | 7/2012 | Jimenez et al. |
| 8,272,091 | B2 | 9/2012 | Hwang et al. |
| 8,544,132 | B2 | 10/2013 | Gatzemeyer et al. |
| 9,009,902 | B2 | 4/2015 | Kitagawa et al. |
| 9,462,878 | B1 | 10/2016 | Filo et al. |
| 10,441,175 | B2 | 10/2019 | Xi et al. |
| 10,441,393 | B2 | 10/2019 | Miller |
| 10,595,626 | B2 | 3/2020 | Jeanne et al. |
| 10,825,355 | B2 | 11/2020 | Varga et al. |
| 2014/0076633 | A1 | 3/2014 | Terracina et al. |
| 2015/0044629 | A1 | 2/2015 | Wang et al. |
| 2015/0113747 | A1 | 4/2015 | May et al. |
| 2015/0127371 | A1* | 5/2015 | Dykes .............. G16H 40/67 705/2 |
| 2015/0335145 | A1 | 11/2015 | Bloch et al. |
| 2016/0081465 | A1 | 3/2016 | Metter |
| 2016/0143718 | A1 | 5/2016 | Serval et al. |
| 2017/0116665 | A1 | 4/2017 | Alzahrani |
| 2017/0188836 | A1 | 7/2017 | Xi et al. |
| 2018/0368564 | A1 | 12/2018 | Zheng |
| 2019/0151058 | A1 | 5/2019 | Okai et al. |

FOREIGN PATENT DOCUMENTS

| | | |
|---|---|---|
| CN | 206167094 | 5/2017 |
| CN | 106923488 | 7/2017 |
| CN | 206390550 | 8/2017 |
| ES | 2377115 | 3/2012 |
| KR | 101774403 B1 * | 9/2017 |
| RU | 2012134751 | 2/2014 |
| WO | 2013/001462 | 1/2013 |
| WO | 2016/174251 | 11/2016 |
| WO | 2017/001399 | 1/2017 |
| WO | 2017/029469 | 2/2017 |
| WO | 2017/107701 | 6/2017 |

OTHER PUBLICATIONS

International Search Report and the Written Opinion of the International Searching Authority issued in international application PCT/US2018/060985 mailed Feb. 14, 2019.

* cited by examiner

ORAL CARE APPARATUS

CROSS-REFERENCE TO RELATED APPLICATIONS

The present application is a continuation of U.S. patent application Ser. No. 16/190,697, filed Nov. 14, 2018, now U.S. Pat. No. 11,141,252 which claims priority to Chinese Patent Application Serial No. 201711155369.X, filed Nov. 17, 2017, the entireties of which are incorporated herein by reference.

BACKGROUND

Myriad implements and devices for maintaining oral health are known. For example, toothbrushes of both the manual and powered variety, floss, dentifrices, applicators, agents, and the like are all known to provide different benefits in the oral cavity. Moreover, some devices and methods exist to monitor oral health. A new trend has been to enable communication between an oral care implement and a display device to enable a user to visualize and/or track his or her oral hygiene habits on a screen on the display device. However, such devices typically include after-market attachments for the oral care implement that include the necessary electronic components and these are not aesthetically pleasing. Alternatively, such devices may include the electronic components built directly into the device, which is expensive for the consumer because it requires the user to replace the entire product when the brush head needs to be replaced. Thus, a need exists for an oral care implement of the type described herein that is aesthetically pleasing, simple to use, easy to handle for persons of all ages, and that reduces consumer costs by enabling the consumer to reuse the electronic components while replacing the cleaning portions that tend to wear out quickest.

BRIEF SUMMARY

The present invention is directed to an oral care apparatus that includes an oral care implement and a tracking module detachably coupled to the oral care implement. The oral care implement includes a body having an inner surface that defines an internal cavity. The tracking module may be coupled to the oral care implement by inserting a portion of the tracking module into the internal cavity of the body. The tracking module includes a coupling portion and an electronics portion that are coupled together so as to be fixed together in the axial direction but freely rotatable relative to one another. The tracking module may only be able to be inserted into the internal cavity of the body in a single orientation. Furthermore, when in the internal cavity, the electronics portion of the tracking module may be non-rotatable relative to the body while the coupling portion of the tracking module remains rotatable relative to the body.

In one aspect, the invention may be an oral care apparatus comprising: an oral care implement comprising a body having an internal cavity; a tracking module extending along a longitudinal axis, the tracking module comprising: a coupling portion configured to couple the tracking module to the body of the oral care implement; and an electronics portion comprising at least one sensor configured to measure at least one of a position, an orientation, and a movement of the oral care implement when the tracking module is coupled to the oral care implement; wherein the electronics portion and the coupling portion are coupled together so as to be freely rotatable about the longitudinal axis relative to one another; and wherein the oral care apparatus is alterable between: (1) an attached state in which the tracking module is coupled to the oral care implement with the electronics portion of the tracking module at least partially positioned within the internal cavity of the body; and (2) a detached state in which the tracking module is completely separated from the oral care implement In another aspect, the invention may be an oral care apparatus comprising: an oral care implement comprising a body having an internal cavity; a tracking module extending along a longitudinal axis, the tracking module comprising: a coupling portion configured to couple the tracking module to the body of the oral care implement; and an electronics portion comprising at least one sensor configured to measure at least one of a position, an orientation, and a movement of the oral care implement when the tracking module is coupled to the oral care implement; wherein at least a portion of the tracking module is positioned within the internal cavity of the body of the oral care implement so that the electronics portion of the tracking module is non-rotatable relative to the body of the oral care implement while the coupling portion of the tracking module is rotatable relative to the body of the oral care implement to couple the tracking module to the body of the oral care implement.

In yet another embodiment, the invention may be a method of assembling an oral care apparatus that includes an oral care implement and a tracking module that monitors a user's oral care hygiene behavior, the method comprising: providing an oral care implement comprising an internal cavity; providing a tracking module comprising a coupling portion and an electronics portion, the electronics portion comprising at least one sensor configured to measure at least one of a position an orientation, and a movement of the oral care implement when the tracking module is coupled to the oral care implement; inserting at least a portion of the electronics portion of the tracking module into the internal cavity of the body of the oral care implement thereby preventing relative rotational movement between the electronics portion of the tracking module and the body of the oral care implement; and rotating the coupling portion of the tracking module relative to the electronics portion of the tracking module and relative to the body of the oral care implement to couple the tracking module to the oral care implement.

In still another aspect, the invention may be an oral care apparatus comprising: an oral care implement comprising a body having an internal cavity; a tracking module extending along a longitudinal axis, the tracking module comprising: a coupling portion configured to couple the tracking module to the body of the oral care implement; and an electronics portion comprising at least one sensor configured to measure at least one of a position, an orientation, and a movement of the oral care implement when the tracking module is coupled to the oral care implement; wherein the oral care apparatus is alterable between: (1) an attached state in which the tracking module is coupled to the oral care implement with the electronics portion of the tracking module at least partially positioned within the internal cavity of the body; and (2) a detached state in which the tracking module is separated from the oral care implement; and wherein the electronics portion of the tracking module can only be positioned within the internal cavity of the body in a single orientation relative to the body.

In a further aspect, the invention may be an oral care apparatus comprising: an oral care implement comprising a body having an internal cavity, the body extending along a longitudinal axis from a proximal end to a distal end; a tracking module comprising: a coupling portion configured to couple the tracking module to the body of the oral care implement; and an electronics portion comprising a power source and a printed circuit board having at least one sensor thereon, the at least one sensor configured to measure at least one of a position, an orientation, and a movement of the oral care implement when the tracking module is coupled to the oral care implement; wherein the oral care apparatus is alterable between: (1) an attached state in which the tracking module is coupled to the oral care implement with the electronics portion of the tracking module at least partially positioned within the internal cavity of the body; and (2) a detached state in which the tracking module is completely separated from the oral care implement; and wherein in the attached state the printed circuit board is located adjacent to the proximal end of the body of the oral care implement and the power source is located between the printed circuit board and the distal end of the body of the oral care implement.

In another aspect, the invention may be an oral care apparatus comprising: an oral care implement comprising a body having an inner surface that defines an internal cavity, at least one protuberance extending from the inner surface into the internal cavity; a tracking module comprising a coupling portion configured to couple the tracking module to the body of the oral care implement, the coupling portion comprising a neck portion that terminates in a lower distal edge and an upper distal edge, the upper distal edge formed by an upstanding wall extending upwardly from the lower distal edge; a notch formed into the upstanding wall and extending from the upper distal edge downwardly towards the lower distal edge, the notch dividing the upstanding wall into a first portion and a second portion; and wherein the oral care apparatus is alterable between: (1) a detached state in which the tracking module is completely separated from the oral care implement; and (2) an attached state in which the tracking module is at least partially located within the internal cavity of the oral care implement and the tracking module is coupled to the oral care implement; and wherein in the attached state the protuberance extending from the inner surface of the body of the oral care implement nests within the notch in the upstanding wall of the neck portion of the tracking module In still another embodiment, the invention may be an oral care implement comprising: a body extending along a longitudinal axis from a proximal end to a distal end, the body having an inner surface that defines an internal cavity, the inner surface of the body having a first semicircular portion and a second semicircular portion that collectively form the inner surface of the body without overlapping; the inner surface of the body comprising a first alignment feature, a second alignment feature, and a third alignment feature that are circumferentially spaced apart from one another along the inner surface of the body; and wherein the first alignment feature is located along the first semicircular portion of the inner surface of the body and a majority of the second and third alignment features are located along the second semicircular portion of the inner surface of the body.

In yet another embodiment, the invention may be an oral care implement comprising: a body extending along a longitudinal axis from a proximal end to a distal end, the body having an inner surface that defines an internal cavity and an opening at the proximal end; the inner surface of the body having a transverse cross-sectional profile comprising: a first concave portion, a second concave portion, and a third concave portion; and a first channel, a second channel, and a third channel; and wherein the first and second concave portions are separated by the first channel, the second and third concave portions are separated by the second channel, and the third and first concave portions are separated by the third channel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
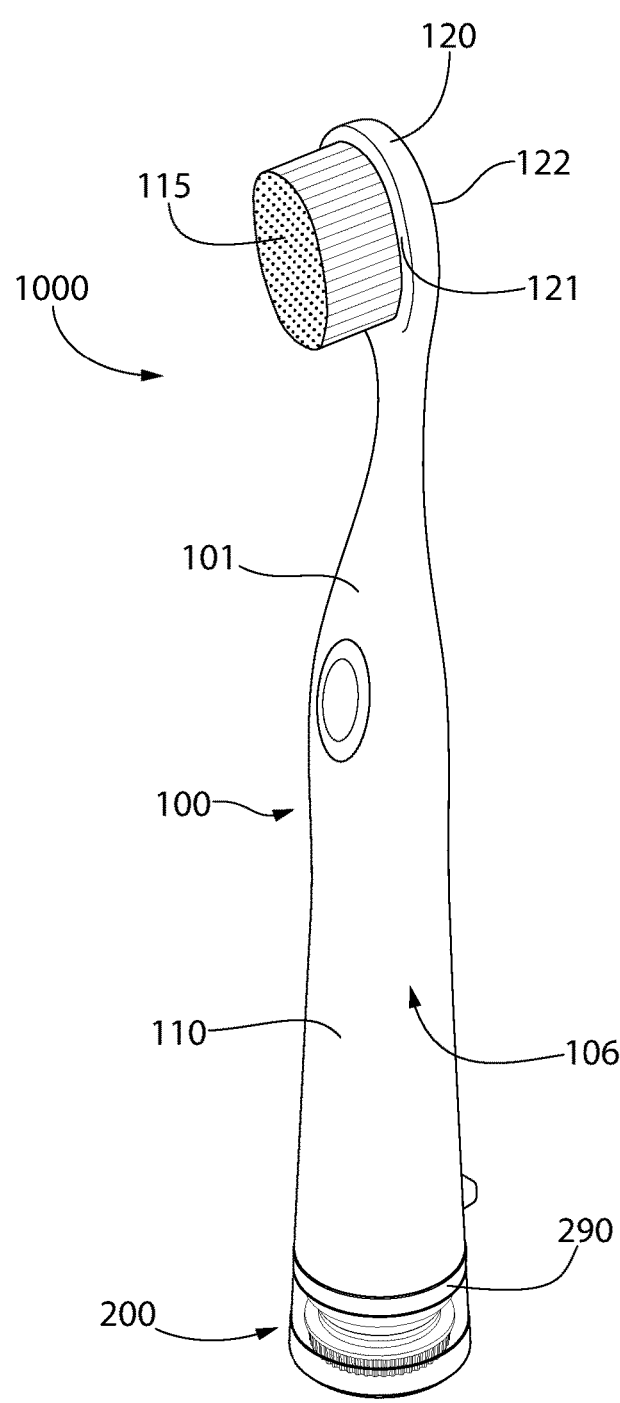
FIG. 1 is front perspective view of an oral care apparatus including an oral care implement and a tracking apparatus in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

Features of the present invention may be implemented in software, hardware, firmware, or combinations thereof. The computer programs described herein are not limited to any particular embodiment and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device," or "device," and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present invention may be embodied in the form of computer-implemented processes and apparatuses such as processor-based data processing and communication systems or computer systems for practicing those processes. The present invention may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Referring first to FIGS. 1-5 concurrently, an oral care apparatus 1000 will be described in accordance with an embodiment of the present invention. The oral care apparatus 1000 generally comprises an oral care implement 100 and a tracking module 200. The oral care implement 100 is used for cleaning a user's oral cavity (i.e., the teeth, gums, and teeth) in a normal manner and the tracking module 200 is used for tracking a user's toothbrushing habits and/or generating data about the user's toothbrushing habits, and/or transmitting that data to an external electronic device where it may be shown on a display. The tracking module 200 may include a processor or other circuitry that makes the tracking module 200 a "smart" device. Thus, in some embodiments the tracking module 200 may be considered a smart module. Alternatively, the tracking module 200 may only include the sensors and a transmitter to transmit data to an external device, and the external electronic device may have the processor to perform the required processing of the data. The oral care implement 100 functions in a similar manner to a standard toothbrush except that it also has a cavity for housing the tracking module 200. In one embodiment, the tracking module includes all of the electronic technology associated with the oral care apparatus 1000 that enables the oral care apparatus 1000 to track a user's toothbrushing habits and provide coaching and instant feedback to the user.

The oral care implement 100 and the tracking module 200 are configured so as to be detachably couplable to one another. Specifically, the oral care apparatus 1000 is alterable between: (1) an attached state, illustrated in FIGS. 1 and 2, in which the tracking module 200 is coupled to the oral care implement; and (2) a detached state, illustrated in FIGS. 3 and 4, in which the tracking module 200 is completely separated from the oral care implement 100. The oral care apparatus 1000 can be readily and easily altered between the attached and detached states as will be appreciated from the description that follows. When assembled, the tracking module 200 is held together as a single part and thus attaching it to and separating it from the oral care implement 100 is a simple task that can be accomplished in a matter of a few seconds.

Figure 2:
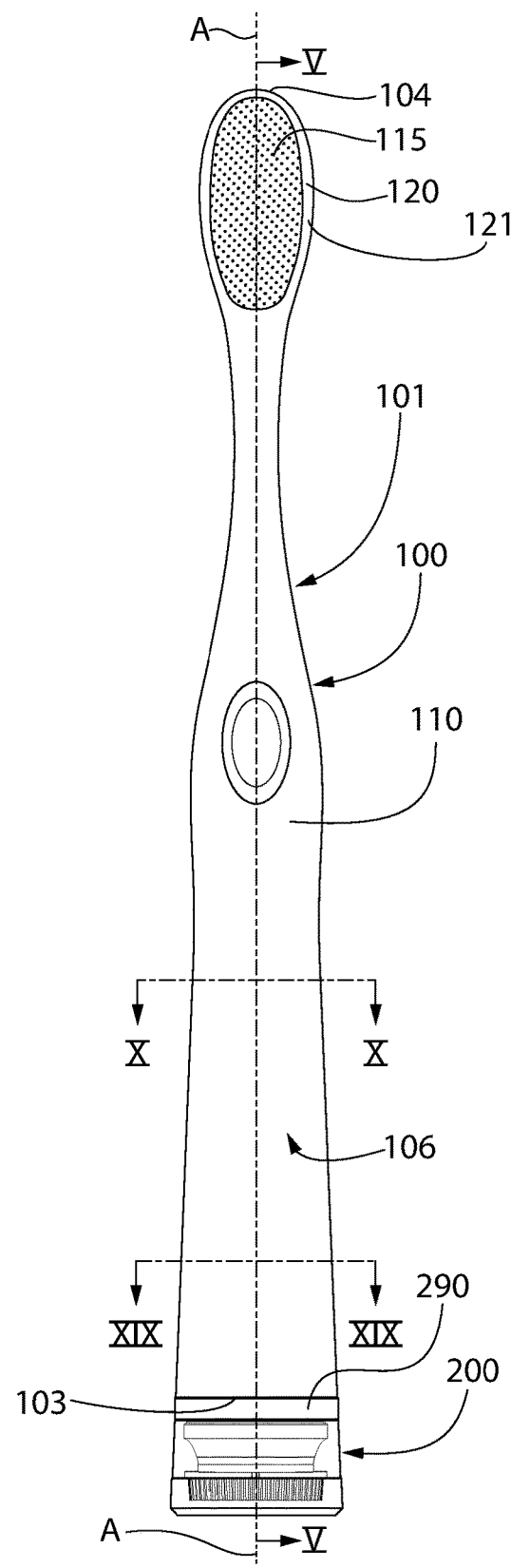
FIG. 2 is a front view of the oral care apparatus of FIG. 1.

As will be discussed in greater detail below, in the exemplified embodiment the tracking module 200 is coupled to the oral care implement 100 by inserting a portion of the tracking module 200 into an internal cavity of the oral care implement 100. As a result, with the oral care apparatus 1000 in the attached state, most of the tracking module 200 is covered from view due to it being located within the internal cavity of the oral care implement 100. As shown in FIGS. 1 and 2, with the oral care apparatus 1000 in the attached state a portion of the tracking module 200 protrudes from the end of the oral care implement 100 so as to be exposed. This exposed portion of the tracking module 200 may serve some functional purposes (e.g., as a stand, as an indicator, etc.), as described in more detail herein below.

In some embodiments, the oral care implement 100 does not include any (i.e., is free of) electronic components. Thus, the oral care implement 100 does not include any switches, power sources, circuitry, wiring, or the like. Rather, all of the electronic components associated with the oral care apparatus 1000 are formed as a part of the tracking module 200. The oral care implement 100 merely serves as the device that is used for oral cavity cleaning and as a housing for holding the tracking module 200. This enables the oral care implement 100 to be replaceable in a cost-effective manner while the tracking module 200 may be reused with a replacement oral care implement 100. This is important because the electronic circuitry of the oral care apparatus 1000 is the most expensive part thereof, and enabling the tracking module 200 to be reused with replacement oral care implements 100 results in reduced costs for the consumer. Furthermore, in the event that the tracking module 200 stores data relevant to a particular user's oral hygiene habits, enabling the user to continue to use that tracking module 200 even as the oral care implement 100 requires replacement increases the longevity of the oral care apparatus 1000 and reduces consumer frustration in having to "start over" with a new tracking module 200 each time the oral care implement 100 requires replacement (i.e., every three months or so). Thus, if the oral care implement 100 requires replacement, a user can simply remove the tracking module 200 from the oral care implement 100 and dispose of the oral care implement 100, purchase a new oral care implement 100, attach the tracking module 200 to the new oral care implement 100, and continue using the oral care apparatus 1000 with the new oral care implement 100 in the normal manner.

In the exemplified embodiment, the oral care implement 100 is a manual toothbrush. Thus, the invention will be described herein with the details predominately directed to a manual toothbrush. However, in certain other embodiments the oral care implement 100 can take on other forms such as being a powered toothbrush (including a motor that moves a bristle holder or a vibratory element that vibrates the head or portions thereof), a tongue scraper, a gum and soft tissue cleanser, a water pick, an interdental device, a tooth polisher, a specially designed ansate implement having tooth engaging elements, or any other type of implement that is commonly used for oral care. Still further, the oral care implement 100 may not be one that is specifically used for oral care in all embodiments, but rather it may be an implement such as a deodorant application implement, a face or body cleaning implement, a make-up applicator implement, a razor or shaving implement, a hairbrush, or the like. Thus, it is to be understood that the inventive concepts discussed herein can be applied to any type of personal care implement unless a specific type of implement is specified in the claims.

In the exemplified embodiment, the oral care implement 100 generally includes a body 101 comprising a handle 110 and a head 120. The oral care implement 100 generally extends along a longitudinal axis A-A from a proximal end 103 to a distal end 104. Conceptually, the longitudinal axis A-A is a reference line that is generally coextensive with the three-dimensional center line of the body 101. Because the body 101 may, in certain embodiments, be a non-linear structure, the longitudinal axis A-A of the body 101 may also be non-linear in certain embodiments. However, the invention is not to be so limited in all embodiments and in certain other embodiments the body 101 may have a simple linear arrangement and thus a substantially linear longitudinal axis A-A.

The handle 110 is an elongated structure that provides the mechanism by which the user can hold and manipulate the oral care implement 100 during use. In the exemplified embodiment, the handle 110 is generically depicted having various contours for user comfort. Of course, the invention is not to be so limited in all embodiments and in certain other embodiments the handle 110 can take on a wide variety of shapes, contours and configurations, none of which are limiting of the present invention unless so specified in the claims.

In the exemplified embodiment, the body 101 including the handle 110 and the head 120 is formed of a rigid plastic material, such as, for example without limitation, polymers and copolymers of ethylene, propylene, butadiene, vinyl compounds, and polyesters such as polyethylene terephthalate. Of course, the handle 110 may include a resilient material, such as a thermoplastic elastomer, as a grip cover that is molded over portions of or the entirety of the handle 110 to enhance the gripability of the handle 110 during use. For example, portions of the handle 110 that are typically gripped by a user's palm during use may be overmolded with a thermoplastic elastomer or other resilient material to further increase comfort to a user.

The head 120 of the oral care implement 100 is coupled to the handle 110 and comprises a front surface 121, an opposing rear surface 122, and a peripheral surface extending between the front and rear surfaces 121, 122. In the exemplified embodiment, the head 120 is formed integrally with the handle 110 as a single unitary structure using a molding, milling, machining or other suitable process. However, in other embodiments the handle 110 and the head 120 may be formed as separate components which are operably connected at a later stage of the manufacturing process by any suitable technique known in the art, including without limitation thermal or ultrasonic welding, a tight-fit assembly, a coupling sleeve, threaded engagement, adhesion, or fasteners. In some embodiments, the head 120 may be detachable from the handle 110 (see, for example, FIGS. 16A and 16B).

In the exemplified embodiment, a plurality of tooth cleaning elements 115 extend from the front surface 121 of the head 120. In the exemplified embodiment, the tooth cleaning elements 115 are generically illustrated. In certain embodiments, the exact structure, pattern, orientation, and material of the tooth cleaning elements 115 are not to be limiting of the present invention. Thus, the term "tooth cleaning elements" may be used herein in a generic sense to refer to any structure that can be used to clean, polish or wipe the teeth and/or soft oral tissue (e.g. tongue, cheek, gums, etc.) through relative surface contact. Common examples of "tooth cleaning elements" include, without limitation, bristle tufts, filament bristles, fiber bristles, nylon bristles, spiral bristles, rubber bristles, elastomeric protrusions, flexible polymer protrusions, combinations thereof, and/or structures containing such materials or combinations. Suitable elastomeric materials include any biocompatible resilient material suitable for uses in an oral hygiene apparatus. To provide optimum comfort as well as cleaning benefits, the elastomeric material of the tooth or soft tissue engaging elements has a hardness property in the range of A8 to A25 Shore hardness. One suitable elastomeric material is styrene-ethylene/butylene-styrene block copolymer (SEBS) manufactured by GLS Corporation. Nevertheless, SEBS material from other manufacturers or other materials within and outside the noted hardness range could be used.

The tooth cleaning elements 115 of the present invention can be connected to the head 120 in any manner known in the art. For example, staples/anchors, in-mold tufting (IMT) or anchor free tufting (AFT) could be used to mount the cleaning elements/tooth engaging elements. In certain embodiments, the invention can be practiced with various combinations of stapled, IMT or AFT bristles. In AFT, a plate or membrane is secured to the brush head such as by ultrasonic welding. The bristles extend through the plate or membrane. The free ends of the bristles on one side of the plate or membrane perform the cleaning function. The ends of the bristles on the other side of the plate or membrane are melted together by heat to be anchored in place. Any suitable form of cleaning elements may be used in the broad practice of this invention. Alternatively, the bristles could be mounted to tuft blocks or sections by extending through suitable openings in the tuft blocks so that the base of the bristles is mounted within or below the tuft block.

Although not illustrated herein, in certain embodiments a soft tissue cleanser may be coupled to or positioned on the rear surface 122 of the head 120 for cleaning the gums, tongue, and other soft tissue surfaces within a user's oral cavity. An example of a suitable soft tissue cleanser that may be used with the present invention and positioned on the rear surface 122 of the head 120 is disclosed in U.S. Pat. No. 7,143,462, issued Dec. 5, 2006 to the assignee of the present application, the entirety of which is hereby incorporated herein by reference. In certain other embodiments, the soft tissue cleanser may include protuberances, which can take the form of elongated ridges, nubs, or combinations thereof. Of course, the invention is not to be so limited and in certain embodiments the oral care implement 100 may not include any soft tissue cleanser.

Figure 5:
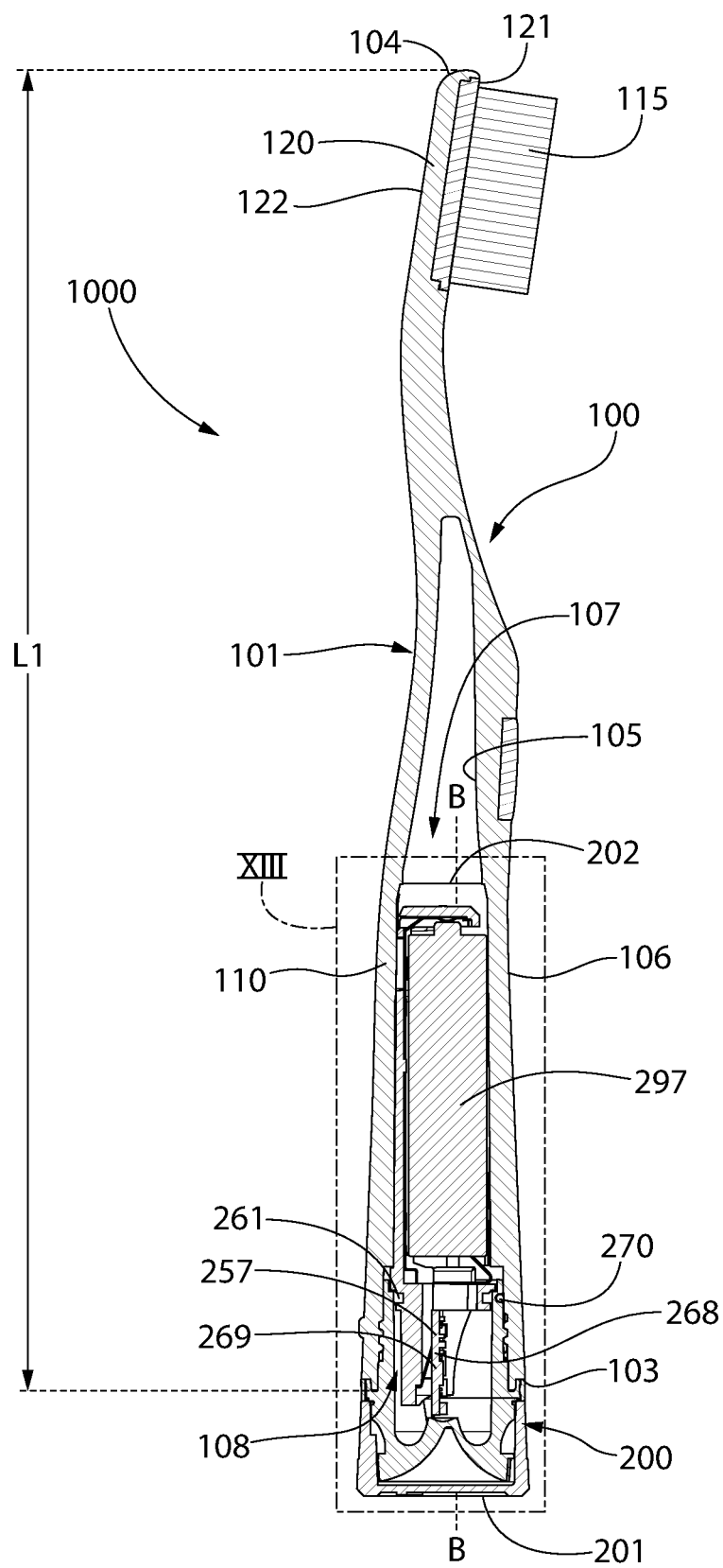
FIG. 5 is a cross-sectional view taken along line V-V of FIG. 2.

As best illustrated in FIG. 5, the body 101 of the oral care implement 100 comprises an inner surface 105 and an outer surface 106. The inner surface 105 of the body 101 defines an internal cavity 107, which is a hollow space within which a portion of the tracking module 200 is positioned when the oral care apparatus 1000 is in the attached state. The oral care implement 100 also comprises an opening 108 at the proximal end 103 of the body 101 that forms a passageway into the internal cavity 107. Thus, as described in greater detail below, the tracking module 200 may be placed into the internal cavity 107 by passing the tracking module 200 through the opening 108 at the proximal end 103 of the body 101 and into the internal cavity 107. The tracking module 200 may also be removed from the internal cavity 107 of the body 101 through the opening 108.

The tracking module 200 extends from a first end 201 to a second end 202 along a longitudinal axis B-B. The tracking module 200 generally comprises a coupling portion 210 and an electronics portion 250. The coupling portion 210 is the portion of the tracking module 200 that is configured to couple the tracking module 200 to the body 101 of the oral care implement 100. The electronics portion 250 comprises the electronic components associated with the oral care apparatus 1000 for achieving a desired functionality. In one exemplary embodiment, the oral care apparatus 1000 is intended to track the position, orientation, and/or movement of the oral care implement 100 while a user brushes his or her teeth to provide a user with real-time information about his or her brushing habits and technique and/or to provide a user with feedback after completion of brushing. To achieve this tracking of the position, orientation, and/or movement of the oral care implement 100, in the exemplified embodiment the electronics portion 250 comprises at least one sensor that is configured to measure at least one of a position, an orientation, and a movement of the oral care implement 100 when the tracking module 200 is coupled to the oral care implement 100. The sensor can then generate date indicative of the position, orientation, and/or movement of the oral care implement 100 and can transmit that data to an external electronic device, as described in more detail below with reference to FIG. 17. Of course, the invention is not limited to the tracking module 200 being configured to track the position, orientation, and/or movement or the oral care implement 100 in all embodiments and other functional goals and purposes may be achieved by the tracking module 200 in other embodiments as an alternative to or in addition to those noted herein.

Figure 17:
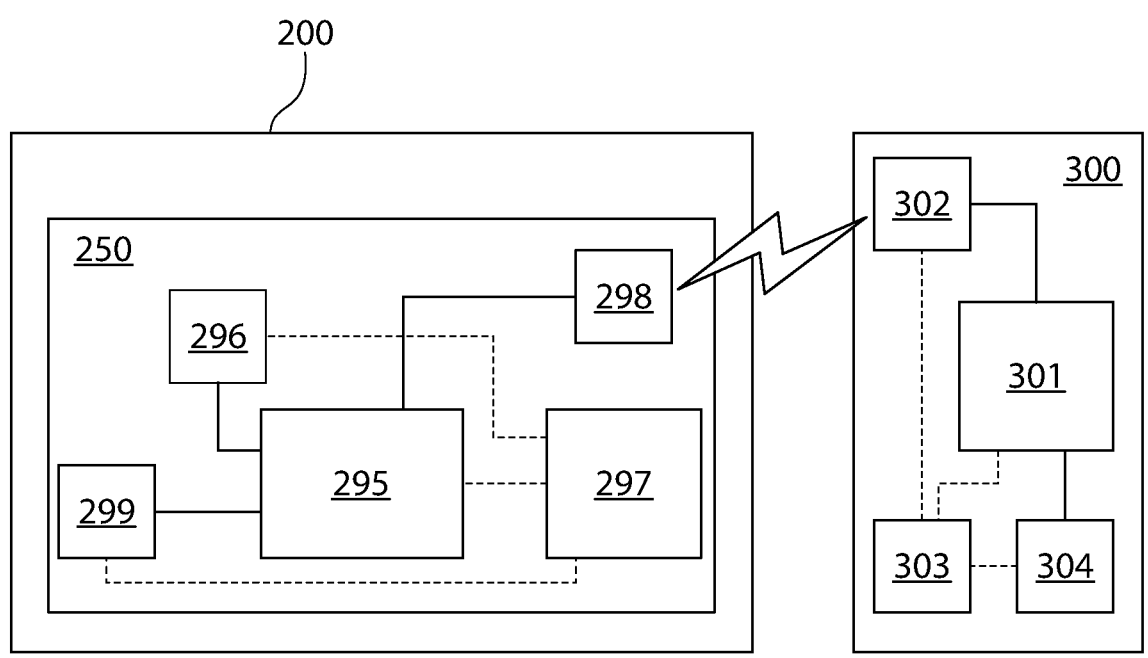
FIG. 17 is a schematic electric diagram illustrating the electronic components of the tracking module and an external electronic device and communication therebetween.

Referring to FIG. 17, an electronic schematic illustrating one exemplary embodiment of the electronics portion 250 of the tracking module 200 is shown in operable communication with an external electronic device 300. The electronic portions 250 of the tracking module 200 may comprise a processor 295, at least one sensor 296, a power source 297, a wireless transmitter or transceiver 298, and an illumination source 299 that are operably coupled together in the manner required to provide power to each of the components and ensure that the processor 295 can receive instructions from and send instructions to each of the other components as needed. It should be appreciated that not all of these components are required in all embodiments. For example, the illumination source 299 may be an optional component. Furthermore, the processor 295 may be omitted and the processing may occur within the external electronic device 300.

The at least one sensor 296 may be a single sensor or it may be multiple sensors in different embodiments. Specifically, the tracking module 200 may comprise 9-axis sensors including a 3-axis accelerometer, a 3-axis gyroscope, and a 3-axis magnetometer. Of course, the invention is not to be so limited and the tracking module 200 may comprise 6-axis sensors or the like in other embodiments as desired. A 6-axis sensor may include a 3-axis accelerometer and a 3-axis gyroscope, or it may include a 3-axis accelerometer and a 3-axis magnetometer, or it may include a 3-axis gyroscope and a 3-axis magnetometer. Various combinations are possible so long as they enable the tracking module 200 to perform its function, which in the exemplified embodiment is tracking position, orientation, and/or movement of the oral care implement 100 within a user's oral cavity during toothbrushing. Thus, for purposes of this disclosure, the at least one sensor 296 may be selected from the group consisting of an accelerometer, a gyroscope, and a magnetometer, and the at least one sensor 296 may include more than one of these components.

The transceiver 298 may be any device configured to permit communication between the tracking module 200 and another electronic device (i.e., the external electronic device 300). Thus, the transceiver may be a Bluetooth transceiver, Wi-Fi, Near Field Communication (NFC), GSM/UMTS, infrared wireless communication, satellite communication, Zigbee, or the like. In the exemplified embodiment communication between the tracking module 200 and the external electronic device 300 is wireless, but it may be wired in other embodiments. The power source 297 may be any source capable of providing power to the other electronic components of the tracking module 200. In the exemplified embodiment the power source 297 may be a battery, but the invention is not to be so limited in all embodiments and the power source 297 may take on any other form as would be readily appreciated by persons in the art.

As described herein, the oral care apparatus 1000, and more specifically the tracking module 200, is configured to communicate with an external electronic device 300. Such an external electronic device 300 may be a mobile phone (e.g., smart phone), a laptop, a tablet, a microcomputer with telecommunication means, or any other device having a display means for displaying information related to toothbrushing activity or the like. In the exemplified embodiment, the external electronic device 300 comprises a processor 301, a transceiver 302 (or a receiver), a power source 303, and a display 304 that are operably coupled together for proper operation of the external electronic device 300. The external electronic device 300 may also include a memory which may be incorporated into the processor 301 or may be a separate component that is operably coupled to the processor 301. The tracking module 200 may communicate wirelessly with the external electronic device 300 via a communication connection between the transceiver 298 of the tracking module 200 and the transceiver 302 of the external electronic device 300 (which may be Bluetooth in the exemplified embodiment).

In certain embodiments as described herein, the tracking module 200 tracks the position, orientation, location, and/or movement of the oral care implement 100 during use. The sensor 296 of the tracking module 200 may generate data indicative of the position, orientation, location, and/or movement of the oral care implement 100 and, via its operable connection to the transceiver 298 (and perhaps also to the processor 295), transmit that data to the external electronic device 300 where it can be displayed on the display 304 of the external electronic device 300. The display 304 may illustrate, using graphics in real-time, the location of the oral care implement 100 within a user's oral cavity. The graphics may illustrate regions of the oral cavity that have already been brushed and regions that have not yet been brushed during a single oral care cleaning session. The graphics may include a game to encourage an individual to brush thoroughly, in a specific brushing pattern, for a specific duration, in a specific location within the oral cavity, or the like. Thus, by placing the tracking module 200 into operable communication with the external electronic device 300, a user can be provided with information regarding his or her brushing habits both during a brushing session (real-time or live) and after completion of a brushing session. The tracking module 200 and/or the external electronic device 300 (such as through a software application that is downloaded and saved on the external electronic device 300) may keep track of a user's brushing habits over time to provide the user with that information so that the user can make adjustments to his or her brushing style if needed.

Figures 3, 4:
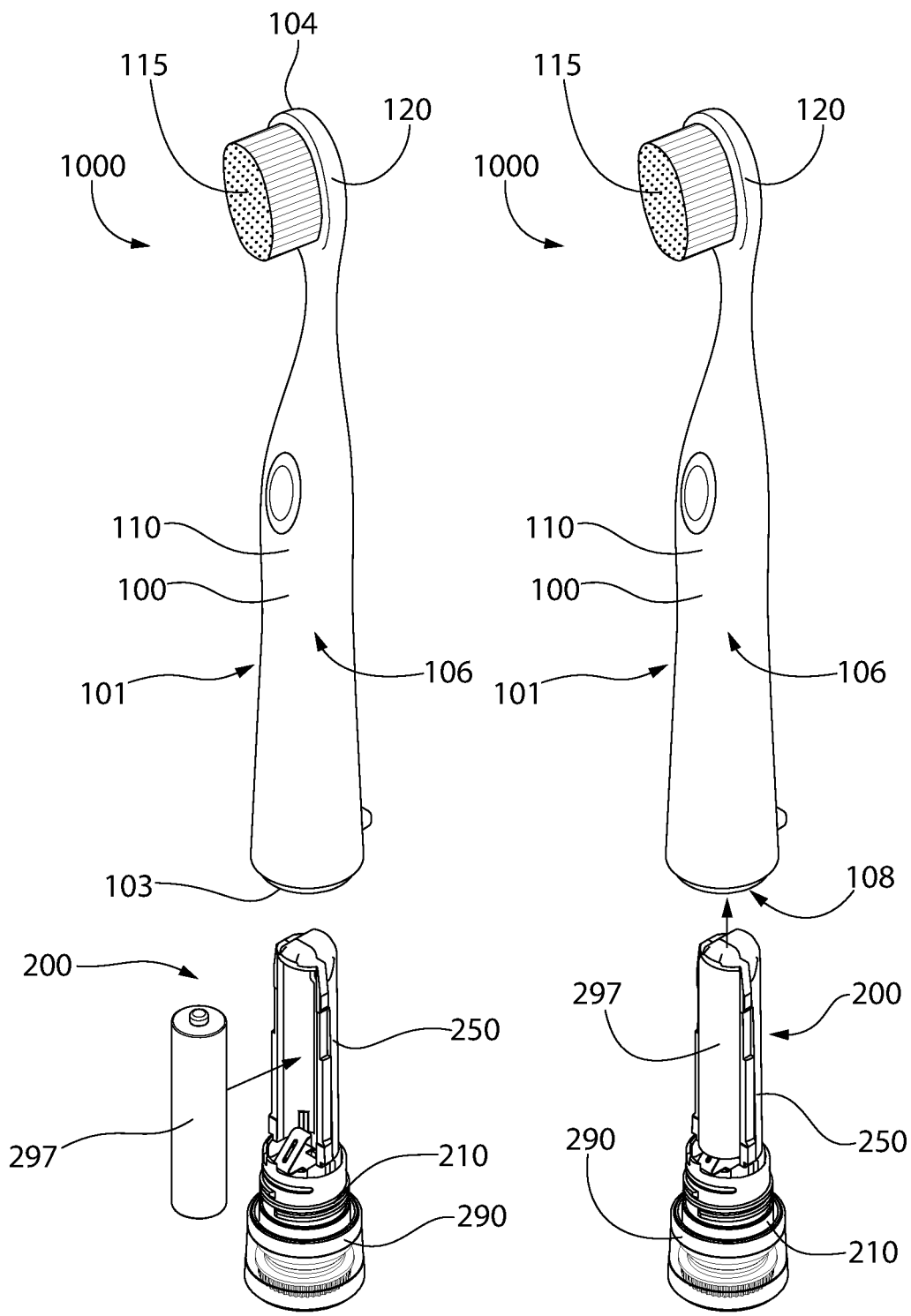
FIG. 3 is an exploded view of the oral care apparatus of FIG. 1 with a power source exploded from a chassis of the tracking module.
FIG. 4 is the exploded view of FIG. 3 with the power source coupled to the chassis of the tracking module.

As noted above, FIGS. 1 and 2 provide different views of the oral care apparatus 1000 in the attached state. FIG. 3 provides a view of the oral care apparatus 1000 in the detached state with the power source 297 also detached from the tracking module 200. FIG. 4 provides a view of the oral care apparatus 1000 in the detached state with the power source 297 attached to the tracking module 200.

Figure 6:
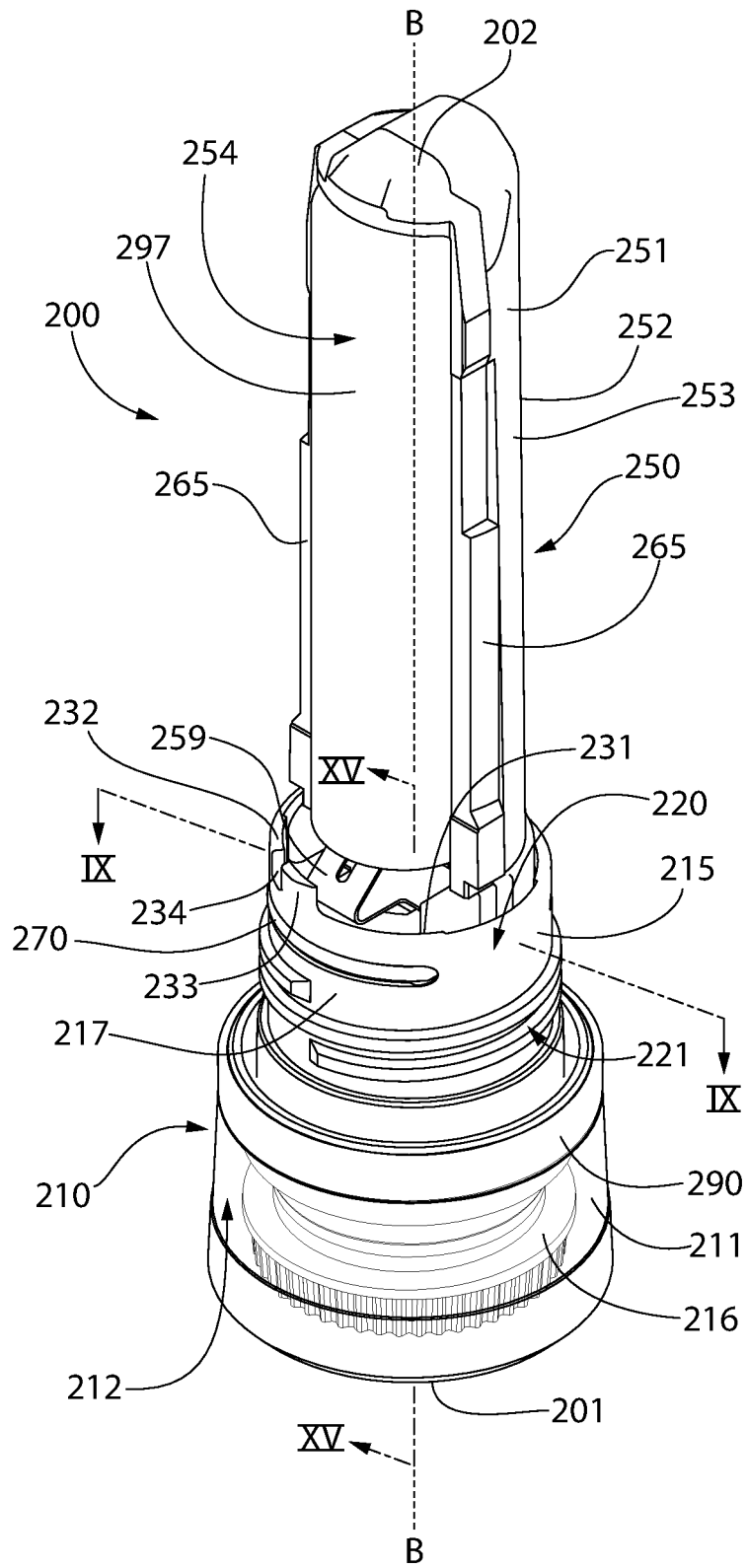
FIG. 6 is a front perspective view of the tracking module of the oral care apparatus of FIG. 1.
Figure 7:
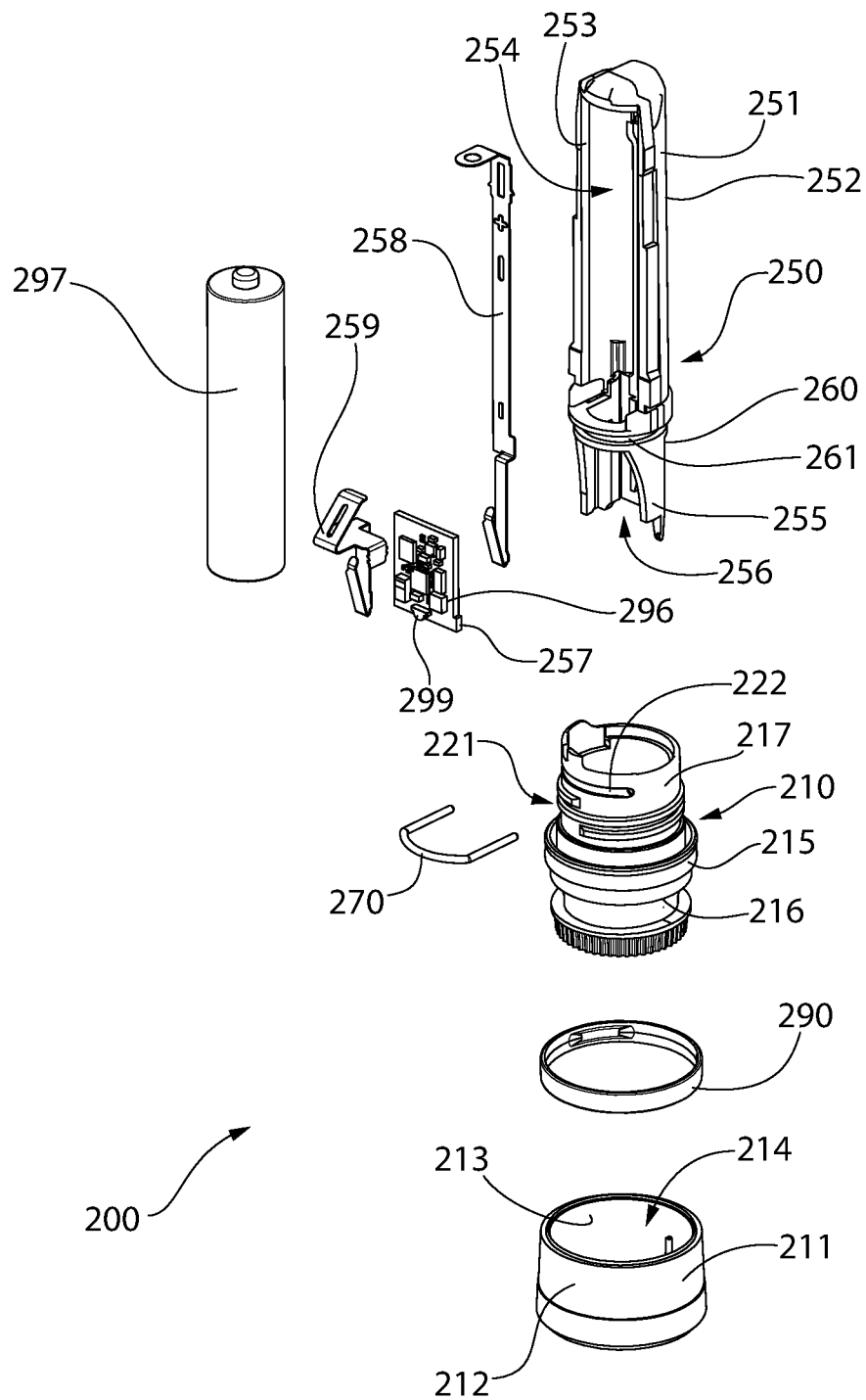
FIG. 7 is an exploded view of the tracking module of FIG. 6.
Figure 8:
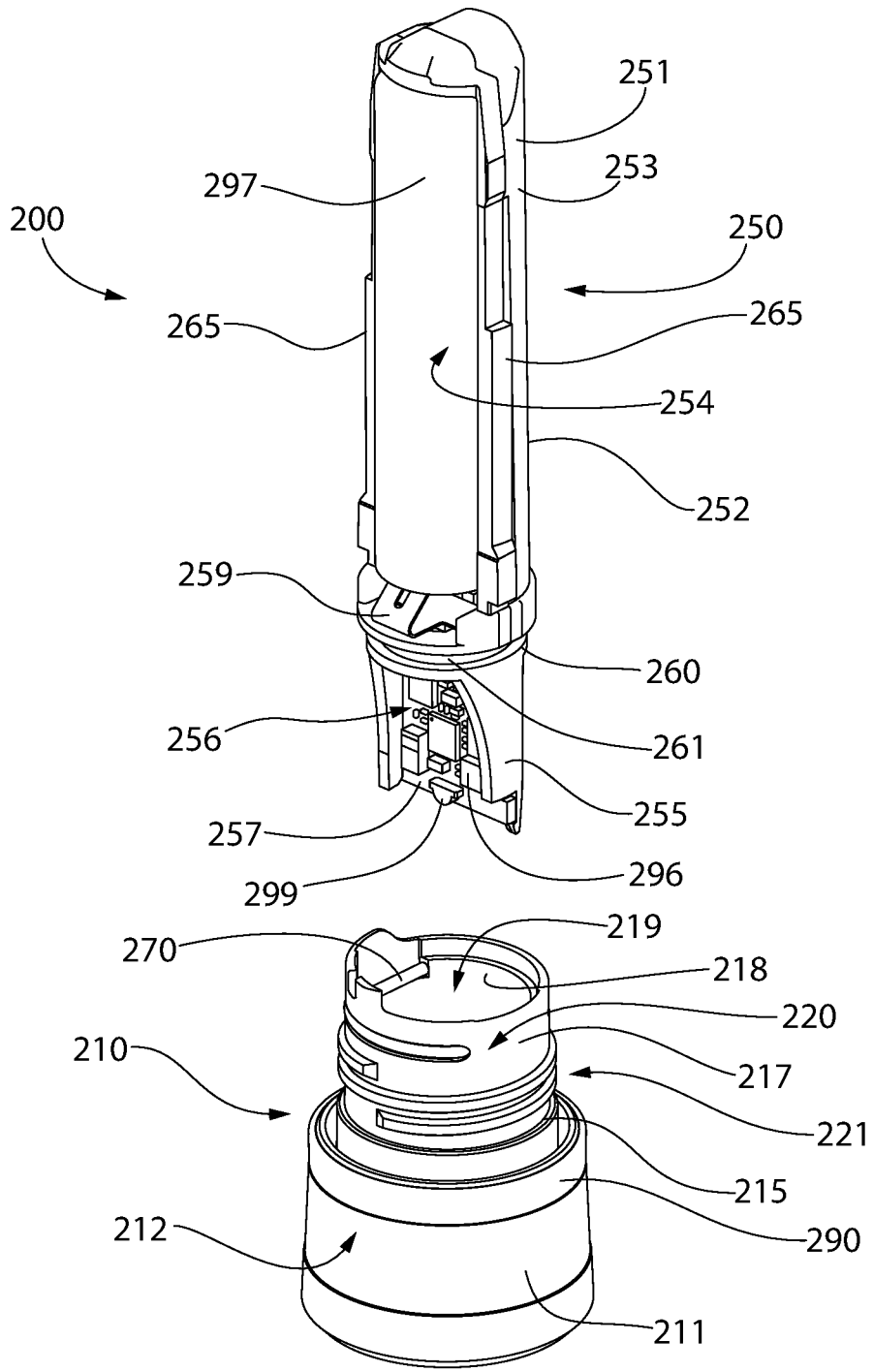
FIG. 8 is a partially exploded view of the tracking module of FIG. 6 illustrating a coupling portion of the tracking module separated from an electronics portion of the tracking module.

Referring to FIGS. 6-8 concurrently, the structural details of the tracking module 200, in accordance with an exemplary embodiment of the present invention, will be described. The tracking module 200 comprises the coupling portion 210 and the electronics portion 250, which are illustrated in their fully assembled forms but separated from one another in FIG. 8. In the exemplified embodiment, the coupling portion 210 of the tracking module 200 comprises a first component 211 and a second component 215 that are coupled together. In some embodiments, each of the first and second components 211, 215 of the coupling portion 210 of the tracking module 200 are formed of a transparent plastic material. Forming the coupling portion 210 out of a transparent material enables a light from a light source to be readily seen through the coupling portion 210 so that the light can be used as an indicator, as described in more detail below. However, the first and second components 211, 215 may be formed of other materials in other embodiments and need not be transparent in all embodiments. Furthermore, although in the exemplified embodiment the coupling portion 210 of the tracking module 200 comprises the first component 211 and the second component 215 as separate structures that are coupled together, the invention is not to be so limited in all embodiments. Rather, in alternative embodiments the coupling portion 210 of the tracking module 200 may be a single unitary and integral component such that the first and second components 211, 215 thereof are a single part.

The first component 211 forms an end cap having an outer surface 212 and an inner surface 213 that defines a cavity 214. When the first and second components 211, 215 are coupled together, a lower portion 216 of the second component 215 is located within the cavity 214 of the first component 211 and a neck portion 217 of the second component 215 extends from the first component 211. The neck portion 217 of the second component 215 of the tracking module 200 comprises an inner surface 218 that defines a cavity 219 and an outer surface 220 having a first connection feature 221 thereon. The first connection feature 221 of the neck portion 217 of the second component 215 of the coupling portion 210 of the tracking module 200 facilitates coupling of the tracking module 200 to the body 101 of the oral care implement 100, as described more fully herein below. In the exemplified embodiment, the first connection feature 221 comprises screw threads. However, the invention is not to be so limited and the first connection feature 221 can take on other structural forms so long as it is configured to couple with a connection feature comprised by the body 101 of the oral care implement 100.

The coupling portion 210 of the tracking module 200 further comprises a personalization ring 290. The personalization ring 290 is coupled to a top edge of the first component or end cap 211 of the tracking module 200. The personalization ring 290 may be detachably coupled to the first component 211 of the tracking module 200 so that it can be swapped out or exchanged for a different personalization ring 290, as discussed in more detail below with reference to FIGS. 14A-14C. The personalization ring 290 may be any color, pattern, texture, or the like to assist a user in identifying the tracking module 200 or oral care apparatus 1000 that belongs to that particular user. The personalization ring 290 is exposed in the fully assembled oral care apparatus 1000 (in the attached state) so that it is visible for identification purposes.

The electronics portion 250 of the tracking module 200 comprises a chassis 251 having an outer surface 252. The chassis 251 comprises a first portion 253 forming a first compartment 254 that retains the power source 297 and a second portion 255 forming a second compartment 256 that retains the at least one sensor 296. More specifically, in the exemplified embodiment the first compartment 254 is size and shaped to hold a battery therein when a battery (such as a AA or AAA alkaline battery) is used as the power source 297. However, the size of the first compartment 254 may be modified as needed so that it is configured to retain any desired power source. Furthermore, as seen in FIG. 7, the at least one sensor 296 is located on a printed circuit board 257 on which the at least one sensor 296 and all of the other necessary circuit components (i.e., the processor 295, the transceiver 298, the illumination source 299, capacitors, diodes, resistors, integrated circuits, and the like) are mounted in the traditional manner. The printed circuit board 257 is then retained within the second compartment 256 formed by the second portion 255 of the chassis 251. The printed circuit board 257 may be removably positioned within the second compartment 256 via engagement between a slot of the second compartment 256 and opposing edges of the printed circuit board 257. Alternatively, the printed circuit board 257 may be non-removably coupled to the chassis 251 within the second compartment 256 by using adhesive, welding, or the like to securely retain the printed circuit board 257 in place within the second compartment 256.

A first electrical contact element 258 is in contact with a first terminal of the power source 297 and with a first electrical contact (not shown) on the printed circuit board 257. A second electrical contact element 259 is in contact with a second terminal of the power source 297 and with a second electrical contact (not shown) on the printed circuit board 257. The first and second electrical contact elements 258, 259 are electrically isolated from one another. In this manner, power from the power source 297 is supplied to the printed circuit board 257 and the electronic components thereon. Thus, the tracking module 200 is a stand-alone unit that includes all of the electronic circuitry needed to perform the toothbrushing tracking functions described herein including a power source to power the electronic circuitry.

The chassis 251 has a third portion 260 located in between the first and second portions 253, 255. Furthermore, the chassis 251 has a locking feature 261 within the third portion 260 of the chassis 251 between the first and second portions 253, 255 of the chassis 251. The locking feature 261 facilitates coupling of the coupling portion 210 of the tracking module 200 to the electronics portion 250 of the tracking module 200, the details of which will be described herein below. In the exemplified embodiment, the locking feature 261 is an annular groove formed into the third portion 260 of the chassis 251. Of course, the invention is not to be so limited in all embodiments and the locking feature 261 may be an annular ridge or the like in other embodiments.

The electronics portion 250 and the coupling portion 210 of the tracking module 200 are coupled together in the following manner. First, a battery or other power source 297 is placed within the first compartment 254 and the printed circuit board 257 is placed within the second compartment 256. Next, the second portion 255 of the chassis 251 with the printed circuit board 257 retained in the second compartment 256 is inserted into the cavity 219 of the neck portion 217 of the second component 215 of the coupling portion 210. The electronics portion 250 and the coupling portion 210 continue to be translated towards one another in the axial direction until the locking feature 261 (i.e., the annular groove) of the chassis 251 is aligned with a channel 222 formed into the outer surface 220 of the neck portion 217 of the second component 215 of the coupling portion 210.

Next, a locking element 270 is inserted through the channel 222 until the locking element 270 at least partially nests within the annular groove of the locking feature 261. In the exemplified embodiment, the locking element 270 comprises a staple and it is a separate component from the coupling portion 210 and the electronics portion 250 of the tracking module 200. However, the locking element 270 may be an integral part of the coupling portion 210 or the electronics portion 250 in other embodiments. The locking element 270 remains engaged with the neck portion 217 of the second component 215 of the coupling portion 210 as it nests within the annular groove of the locking feature 261 of the chassis 251 of the electronics portion 250. Thus, the locking element 270 is coupled to the neck portion 217 of the coupling portion 210 and nests within the annular groove of the locking feature 261 of the electronics portion 250. As a result, once the locking element 270 is inserted into the channel 222 and nests within the annular groove of the locking feature 261, the coupling portion 210 and the electronics portion 250 are substantially fixed relative to one another in an axial direction. Thus, the coupling portion 210 and the electronics portion 250 cannot be readily separated from one another without first disengaging the locking element 270 from the annular groove of the locking feature 261. However, when coupled together in this manner, the electronics portion 250 and the coupling portion 210 are freely rotatable about the longitudinal axis B-B relative to one another. The electronics portion 250 and the coupling portion 210 are not movable relative to one another in the axial direction.

Figure 9A:
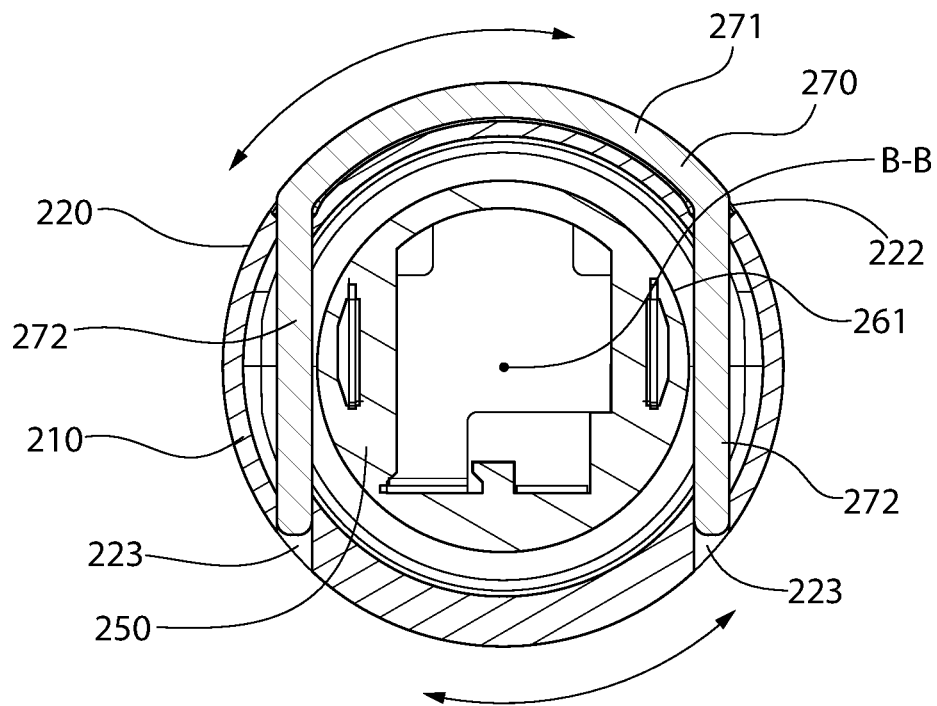
FIG. 9A is a cross-sectional view taken along line IX of FIG. 6.
Figure 9B:
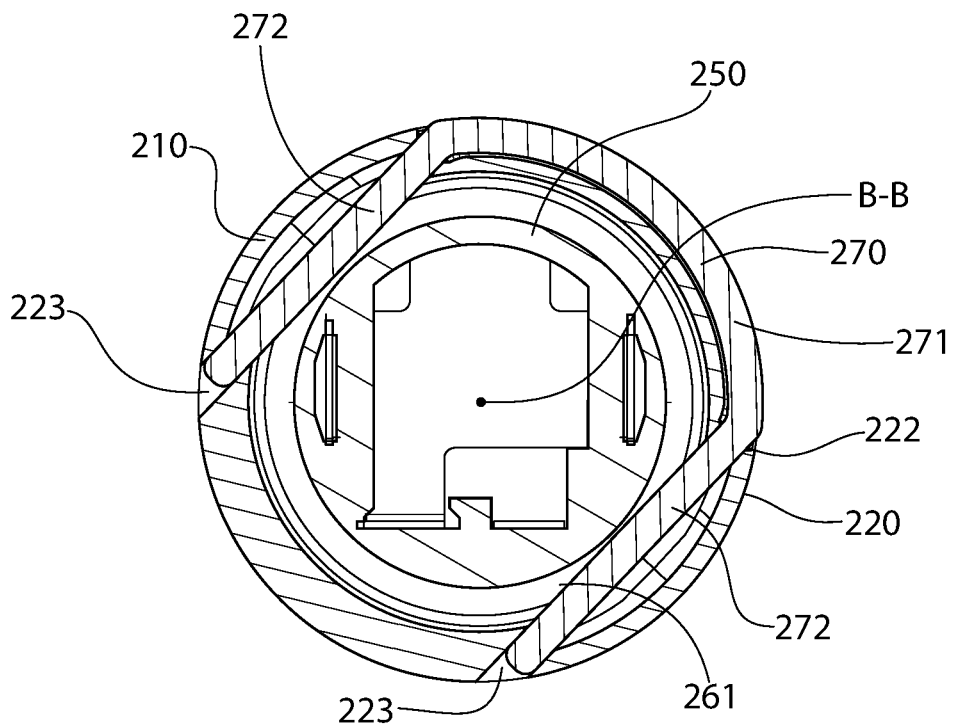
FIG. 9B is the cross-sectional view of FIG. 8A with the coupling portion of the tracking module rotated relative to the electronics portion of the tracking module.

The relative rotation between the coupling portion 210 and the electronics portion 250 is illustrated in FIGS. 9A and 9B. FIG. 9A illustrates the locking element 270 in place so that a bight portion 271 of the locking element 270 is located within the channel 222 of the neck portion 217 of the coupling portion 210 and the legs 272 of the locking element 270 extend into openings 223 on an opposite side of the neck portion 217 of the coupling portion 210. Furthermore, the legs 272 also nest within the annular groove of the locking feature 261. This manner of coupling the coupling portion 210 to the electronics portion 250 permits those two components to be freely rotatable about the longitudinal axis B-B relative to one another. This is best shown by comparing FIG. 9A to FIG. 9B where it can be seen that the coupling portion 210 is rotating about the longitudinal axis B-B while the electronics portion 250 remains in the same rotational position. The coupling portion 210 and the electronics portion 250 can rotate freely in both rotational directions relative to one another even while remaining coupled axially together due to the locking element 270. Stated another way, although the coupling portion 210 and the electronics portion 250 are freely rotatable relative to one another (they can be rotated 360° relative to one another), the coupling portion and the electronics portion 250 are substantially fixed relative to one another in the axial direction.

Figure 15:
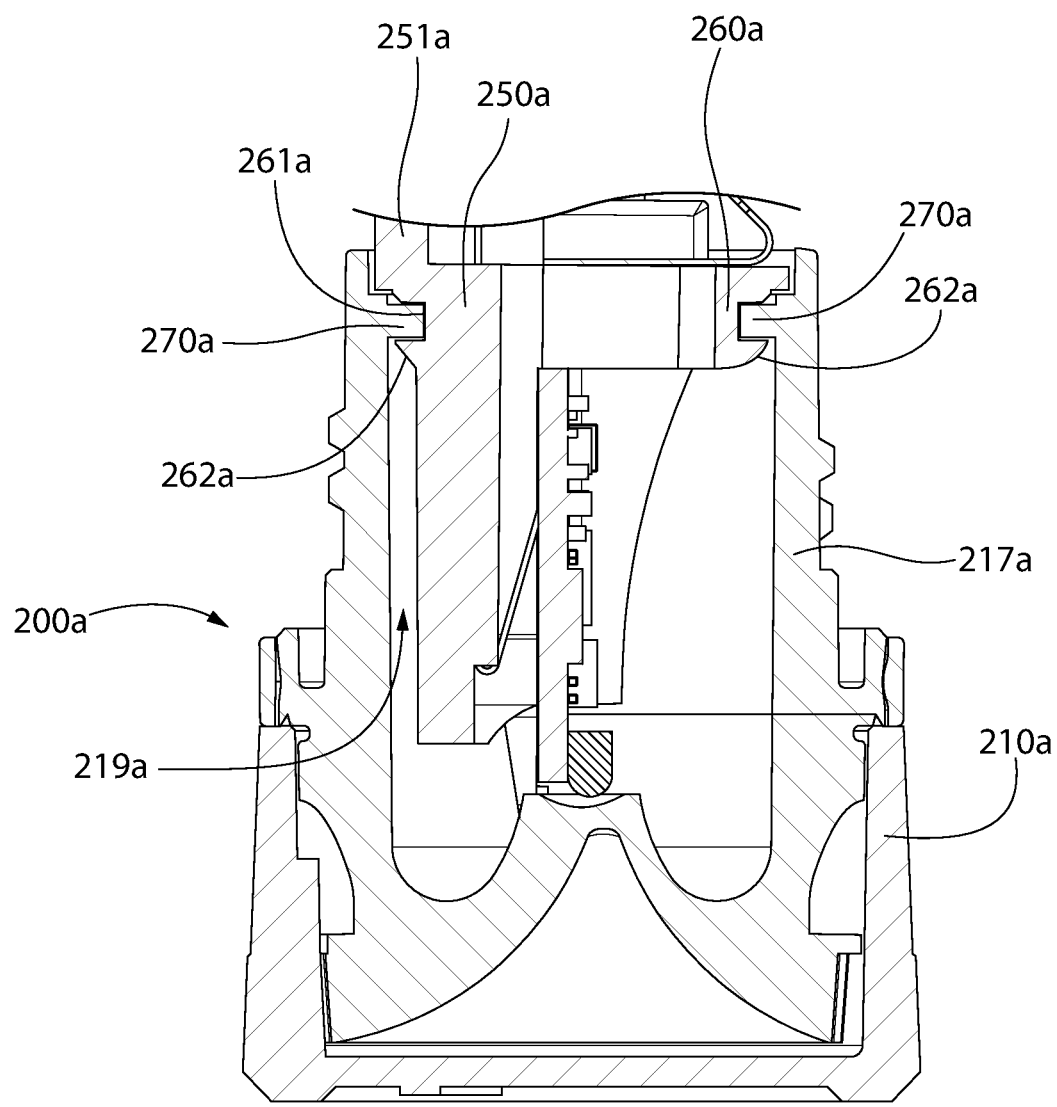
FIG. 15 is a cross sectional view taken along line XV-XV of FIG. 6 illustrating an alternative embodiment of the tracking module.

In an alternative embodiment, the locking feature 261 may be an integral part of the coupling portion 210 of the tracking module 200 rather than being a staple or some other type of component that is separate from the coupling portion 210 of the tracking module 200. For example, referring briefly to FIG. 15, an alternative embodiment of a portion of a tracking module 200a is illustrated in cross-section. In this embodiment, the staple is omitted and instead the locking element 270a is formed as an annular flange that is an integral part of the coupling portion 210a. Thus, in this embodiment the coupling portion 210a of the tracking module 200a is coupled to the electronics portion 250a of the tracking module 200a by way of the locking element 270a (i.e., the annular flange) nesting within the annular groove of the locking feature 261a. The third portion 260a of the chassis 251a may have a ramped surface 262a to facilitate coupling of the coupling portion 210a to the electronics portion 250a. Specifically, as the electronics portion 250a is inserted into the cavity 219a of the neck portion 217a, the neck portion 217a can flex outwardly as the locking element 270a rides along the ramped surface 262a. Once coupled as shown in FIG. 15, the coupling portion 210a and the electronics portion 250a are substantially fixed relative to one another in the axial direction. However, the engagement between the annular flange of the coupling portion 210a and the annular groove 261a of the electronics portion 250a enables the coupling portion 210a and the electronics portion 250a to be freely rotatable relative to one another about the longitudinal axis B-B of the tracking module 200a.

In both the main embodiment illustrated in FIGS. 6-8 and the alternative embodiment shown in FIG. 15, the coupling portion 210 and the electronics portion 250 are coupled together so as to be substantially fixed relative to one another in the axial direction while being freely rotatable about the longitudinal axis B-B relative to one another. Of course, further alternative embodiments are also possible so long as the coupling portion 210 and the electronics portion 250 are coupled together so as to be freely rotatable relative to one another about the rotational axis while being substantially fixed relative to one another in the direction of the longitudinal axis B-B. Thus, although grooves and ridges/protuberances are illustrated and described herein as being formed into one of the coupling portion 210 or the electronics portion 250, it may be swapped in alternative embodiments. For example, the electronics portion 250 may have a flange that fits within a groove formed into the coupling portion 210 as an alternative to that which is depicted in FIG. 15.

By enabling the coupling portion 210 to freely rotate relative to the electronics portion 250, the electronics portion 250 can be held in the internal cavity 107 of the body 101 in a fixed rotational position while permitting the coupling portion 210 to rotate relative to the electronics portion 250 of the tracking module and relative to the body 101 of the oral care implement 100. It is this structural feature that facilitates coupling of the tracking module 200 to the oral care implement 100 while ensuring that the electronics portion 250 remains in a specific orientation for taking consistent measurements, as described in more detail below with reference to FIGS. 11-13.

Figure 18:
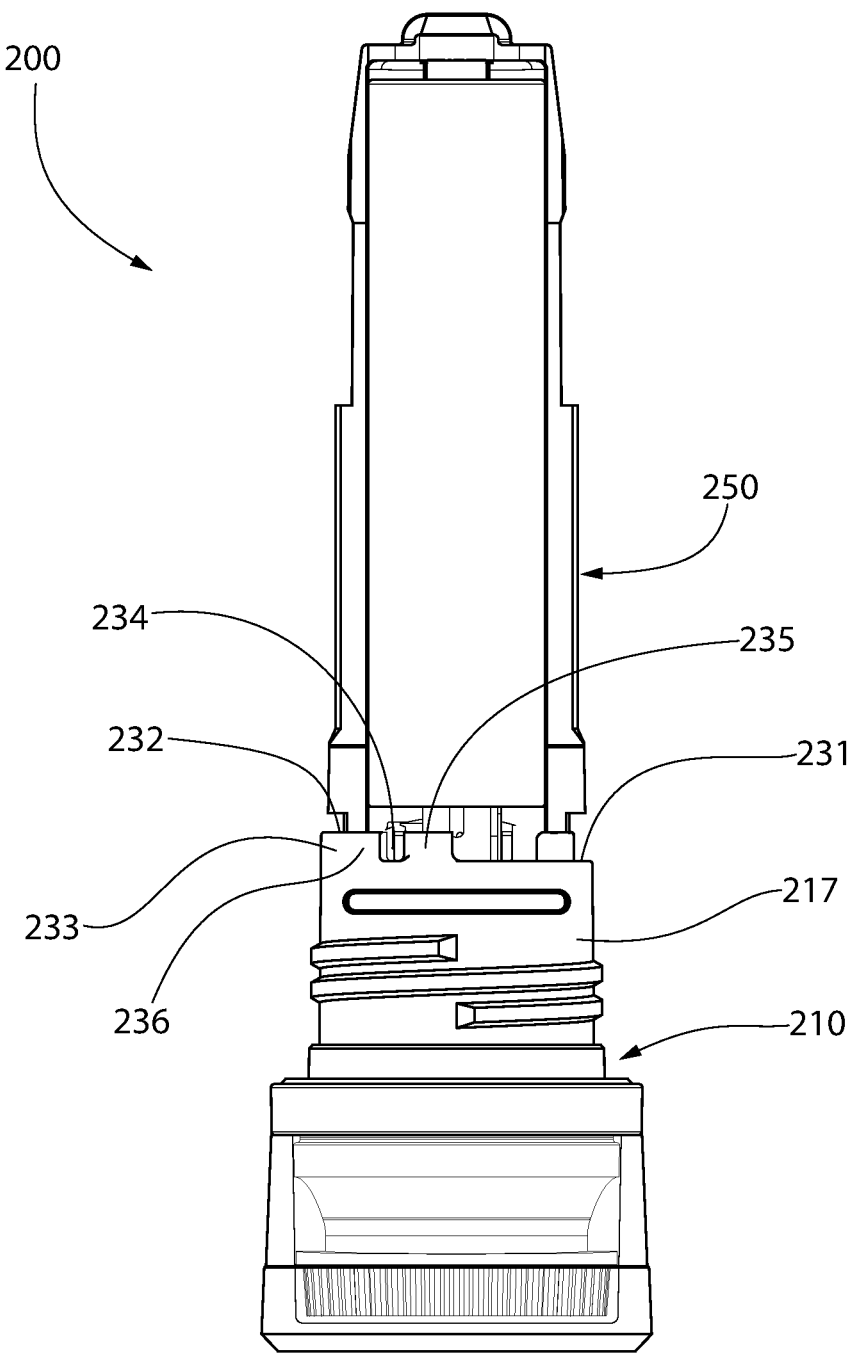
FIG. 18 is a front view of the tracking module of the oral care apparatus of FIG. 1.

Referring to FIGS. 6 and 18, the neck portion 217 of the coupling portion 210 of the tracking module 200 terminates in a lower distal edge 231 and an upper distal edge 232. Specifically, the neck portion 217 comprises an upstanding wall 233 that extends from the lower distal edge 231 to the upper distal edge 232. Furthermore, a notch 234 is formed into the upstanding wall 233 and extends from the upper distal edge 232 in a direction towards the lower distal edge 231. The notch 234 divides the upstanding wall 233 into a first portion 235 and a second portion 236. The notch 234 receives a protuberance of the oral care implement 100 to provide the user with a tactile indication that the tracking module 200 is fully coupled to the oral care implement 100, as discussed in detail below.

Figure 19A:
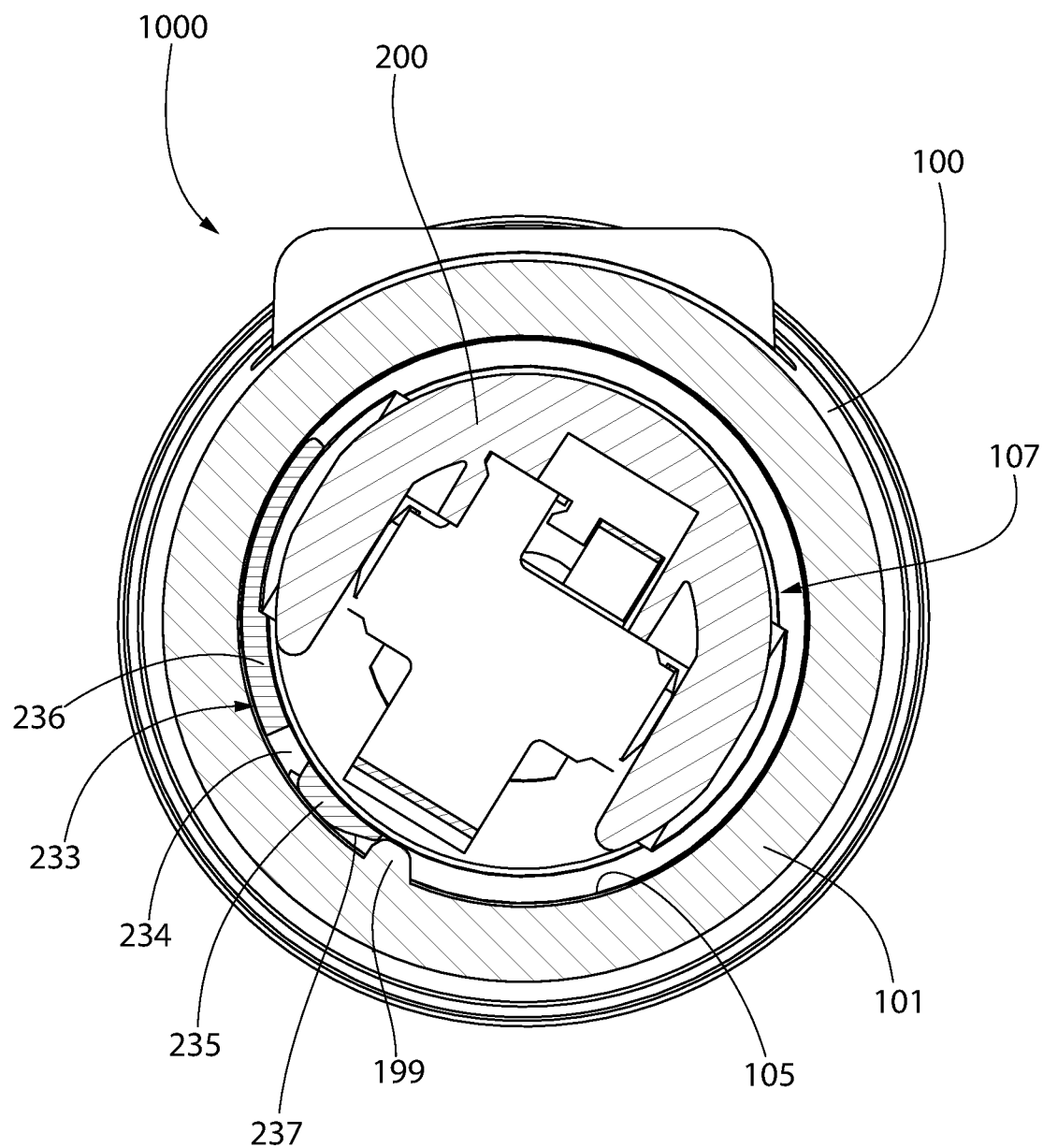
FIG. 19A is a cross-sectional view taken along line IXX-IXX of FIG. 2 with the coupling portion of the tracking module in a first angular position relative to the oral care implement.
Figure 19B:
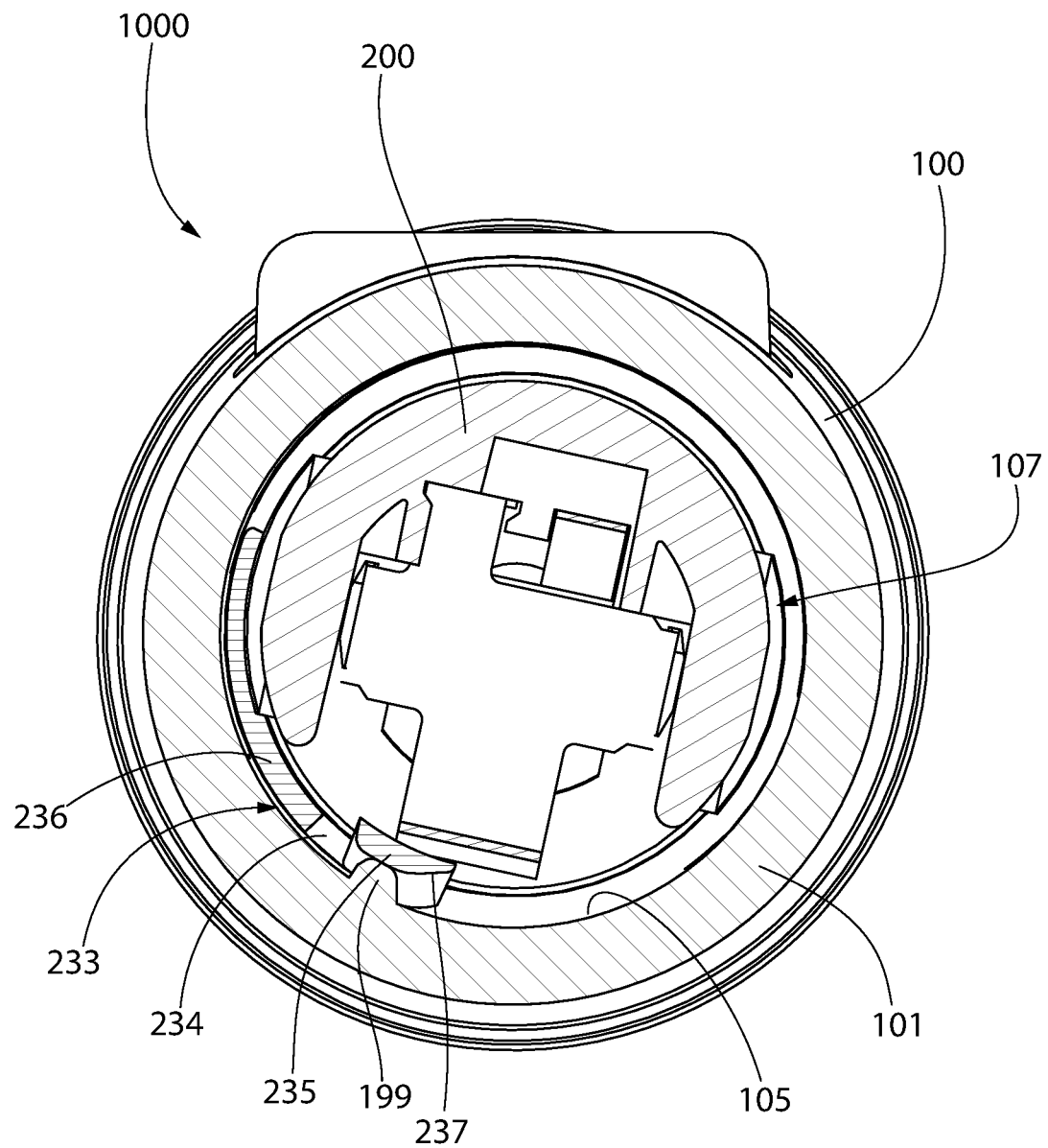
FIG. 19B is a cross-sectional view taken along line IXX-IXX of FIG. 2 with the coupling portion of the tracking module in a second angular position relative to the oral care implement.
Figure 19C:
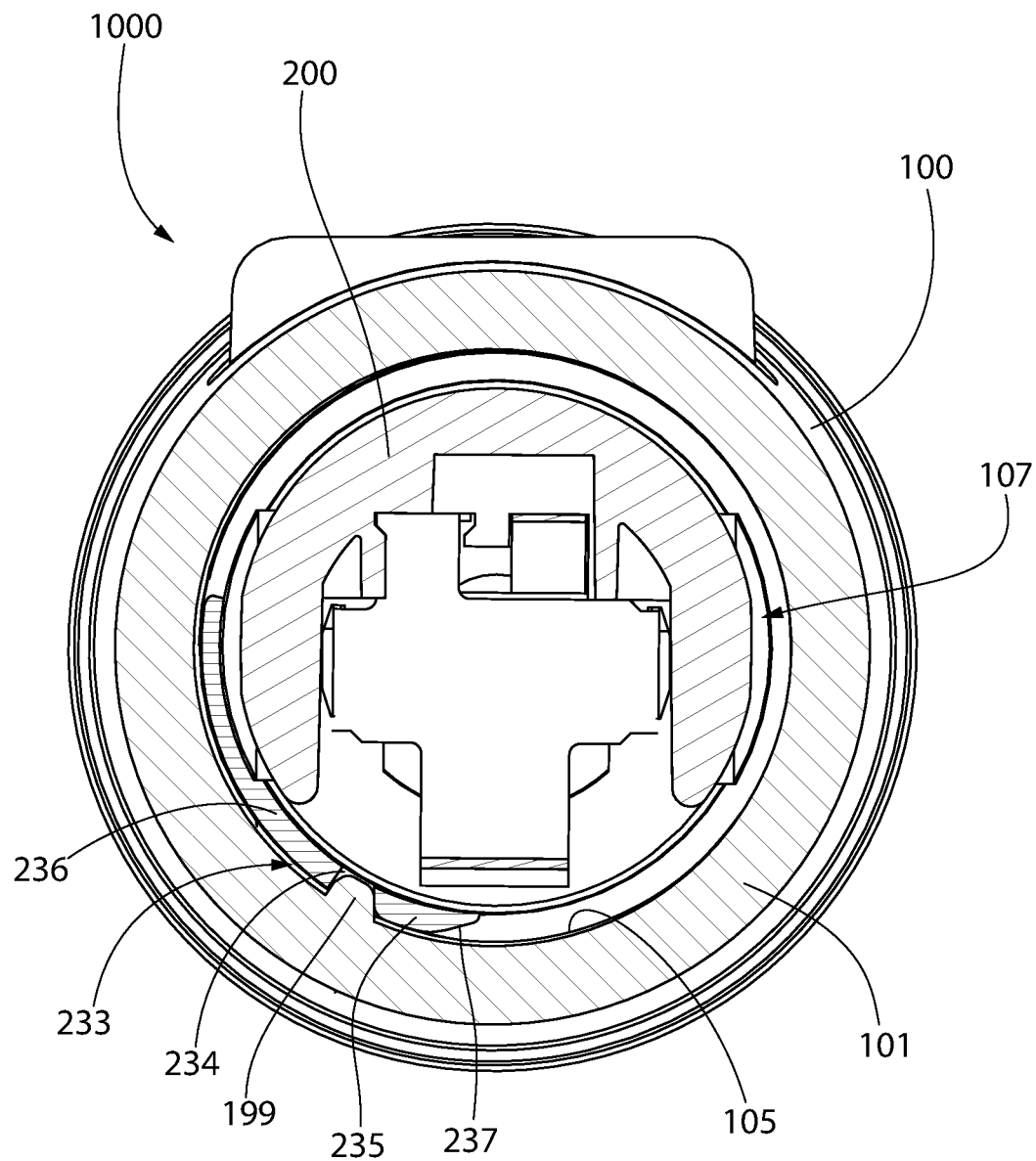
FIG. 19C is a cross-sectional view taken along line IXX-IXX of FIG. 2 with the coupling portion of the tracking module in a third angular position relative to the oral care implement.

Referring to FIGS. 19A-19C, a cross-sectional view of the oral care implement apparatus 1000 is provided at the location of the notch 234. Thus, FIGS. 19A-19C illustrate the oral care apparatus 1000 with the tracking module 200 located within the internal cavity 107 of the body 101 of the oral care implement 100. As can be seen, there is a protuberance 199 extending from the inner surface 105 of the body 101 into the internal cavity 107. As the coupling portion 210 of the tracking module 200 is being rotated relative to the body 101 of the oral care implement 100 as discussed herein above, at some point the upstanding wall 233 becomes axially aligned with the protuberance 199. The protuberance 199 then rides along the first portion 235 of the upstanding wall 233 until the protuberance 199 nests within the notch 234. This progression is illustrated in FIGS. 19A through 19C. Thus, the protuberance 199 rides along the first portion 234 of the upstanding wall 233 during rotation of the coupling portion 210 of the tracking module 200 relative to the body 101 of the oral care implement 100 until the protuberance 199 falls into and becomes nests within the notch 234, as shown in FIG. 19C. In this regard, the first portion 234 of the upstanding wall 233 comprises a ramped or chamfered surface 237 that facilitates this process.

As a result of the interaction between the upstanding wall 233 of the tracking module 200 and the protuberance 199 of the oral care implement 100, a user perceptible tactile event occurs when the tracking module 200 is fully coupled to the oral care implement 100. Specifically, a user might couple the tracking module 200 to the oral care implement 100 via rotation of the coupling portion 210 of the tracking module 200 relative to the body 101 of the oral care implement 100 as described previously. During this rotation, the coupling portion 210 of the tracking module 200 moves axially within the internal cavity 107 of the body 101 until the protuberance 199 and the upstanding wall 233 are at the same axial elevation. At this point, the user will continue to rotate the coupling portion 210 of the tracking module 200 relative to the body 101, but the user will be able to feel, with his or her hand, the protuberance 199 riding along the first portion 235 of the upstanding wall 233 and then snapping into the notch 234. Thus, this provides the user with a tactile indication that no further rotation of the coupling portion 210 of the tracking module 200 is needed because the tracking module 200 is fully coupled to the oral care implement 100.

Figure 10:
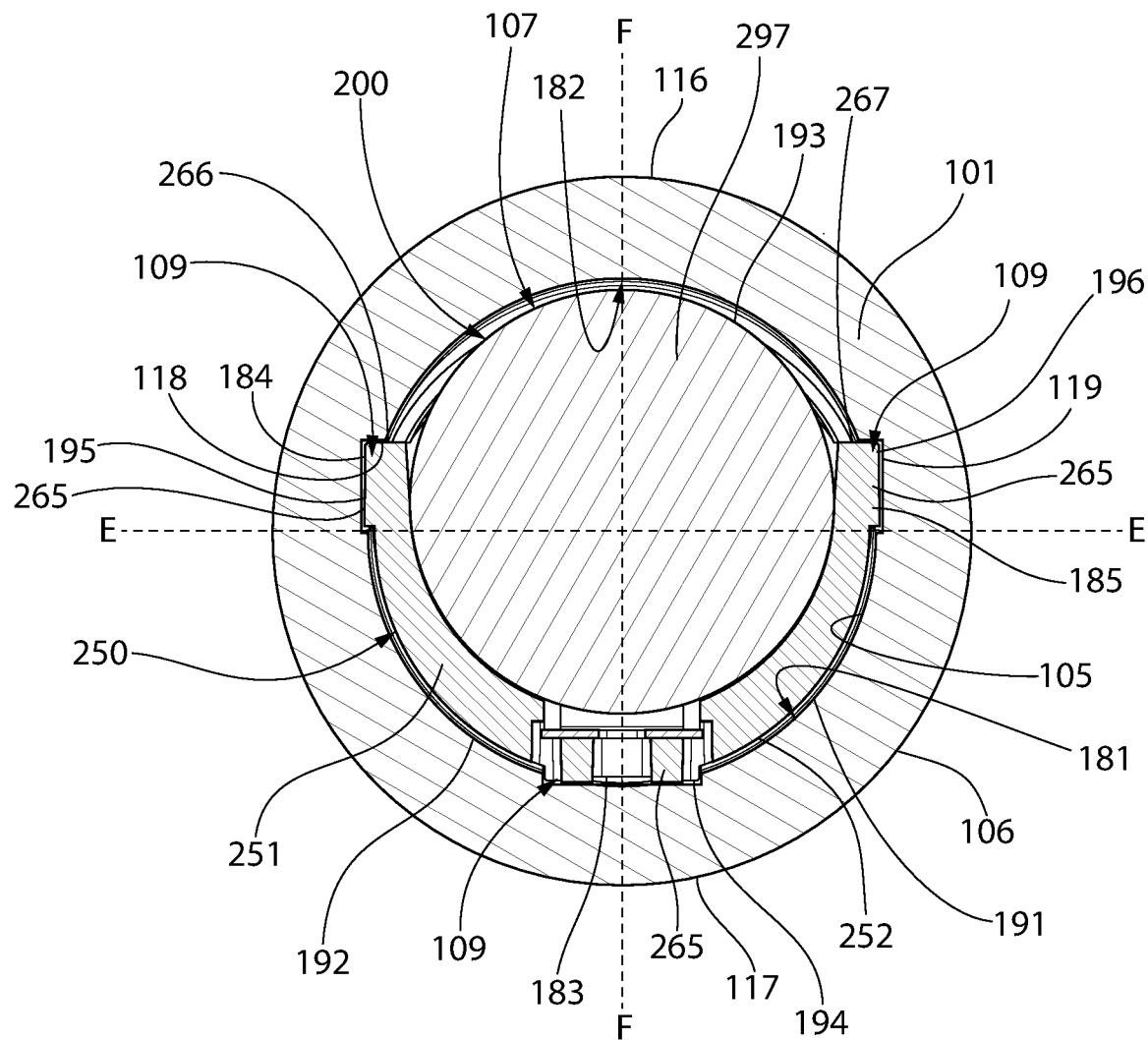
FIG. 10 is a cross-sectional view taken along line IX of FIG. 2.

Referring to FIG. 10, a cross-section of the oral care apparatus 1000 is illustrated in the attached state to show the interaction between the body 101 of the oral care implement 100 and the tracking module 200 that maintains the electronics portion 250 of the tracking module 200 in a specific orientation relative to the body 101. In the exemplified embodiment, the inner surface 105 of the body 101 of the oral care implement 100 comprises a plurality of alignment channels 109 formed therein. In the exemplified embodiment, there are three of the alignment channels 109 formed into the inner surface 105 of the body 101. Of course, more or less than three of the alignment channels 109 are possible in other embodiments. Furthermore, in this embodiment the chassis 251 of the electronics portion 250 of the tracking module 200 comprises a plurality alignment ridges 265 protruding from its outer surface 252. There are three of the alignment ridges 265 illustrated in the exemplified embodiment, but more or less than three of the alignment ridges 265 are possible in other embodiments. Although the alignment channels 109 are formed into the inner surface 105 of the body 101 and the alignment ridges 265 are protruding from the outer surface 252 of the chassis 251 in the exemplified embodiment, the invention is not to be so limited and in other embodiments alignment channels may be formed into the chassis 251 while respective alignment ridges are protruding from the inner surface 105 of the body 101 of the oral care implement 100. Furthermore, although the alignment channels 109 are illustrated as being formed directly into the inner surface 105 of the body 101, in other embodiments the oral care implement 100 may include an insert component that is positioned within the internal cavity 107 and the alignment channels 109 (or alignment ridges as the case may be) may be formed into the insert component.

The alignment ridges 265 of the chassis 251 are angularly/rotationally aligned with the alignment channels 109 in the inner surface 105 of the body 101 so that when the tracking module 200 is positioned within the internal cavity 107 of the body 101, the alignment ridges 265 nest within the alignment channels 109. Due to the angular location of the alignment channels 109 and the alignment ridges 265, the tracking module 200 can only be positioned within the internal cavity 107 of the body 101 in a single orientation and position relative to the body 101. Specifically, because there are three of the alignment ridges 265 and alignment channels 109, there is only one orientation relative to the body 101 at which the tracking module 200 can be inserted into the internal cavity 107. Although three alignment ridges 265 and alignment channels 109 are illustrated in the exemplified embodiment, this can also be achieved with one, two, or more than three of the alignment ridges 265 and alignment channels 109 and/or using other mechanically interlocking and mating features, such as any type of lock-and-key type mating relationship between a feature on the tracking module 200 and a feature on the inner surface 105 of the body 101 of the oral care implement 100. Furthermore, although in the exemplified embodiment the alignment ridges 265 are on the tracking module 200 and the alignment channels 109 are formed into the body 101 of the oral care implement 100, this may be reversed in other embodiments.

In the exemplified embodiment, if the tracking module 200 were rotated in either direction and in any degree relative to the body that is different than that which is shown in FIG. 10, the alignment ridges 265 would not be aligned with the alignment channels 109 and the tracking module 200 would be prevented from being inserted into the internal cavity 109 in that orientation. Thus, the tracking module 200 must be rotated relative to the body 101 until the alignment ridges 265 are exactly aligned with the alignment channels 109, and then the tracking module 200 can be translated into the internal cavity 107. In the exemplified embodiment, in the single orientation the at least one sensor 296 is aligned with the tooth cleaning elements 115 and/or faces in the same direction as the tooth cleaning elements 115.

In some embodiments, the invention described herein may be directed to the oral care implement 100 by itself. Specifically, as discussed above the oral care implement 100 may be sold as a "refill" such that the tracking module 200 may be reused with different oral care implements 100. The refill oral care implements 100 may be needed when the tooth cleaning elements 115 thereof become splayed and require replacement. Alternatively, different oral care implements having different tooth cleaning element patterns and/or configurations may be desired when each achieves a different purpose (general cleaning, gentle cleaning for sensitive teeth/gums, abrasive or thorough cleaning, tooth whitening, or the like). Thus, in some embodiments the oral care implement 100 may in itself form an inventive apparatus.

Still referring to FIG. 10, the inner surface 105 of the body 101 of the oral care implement 100 comprises a first semicircular portion 181 and a second semicircular portion 182 that collectively form the inner surface 105 of the body 101. The first and second semicircular portions 181, 182 have an interface located along a plane E-E that is parallel to the longitudinal axis A-A of the oral care implement 100 and located centrally between front and rear surfaces 116, 117 of the body 105. Stated another way, the plane E-E extends between lateral sides of the body 105 that are located between the front and rear surfaces 116, 117 of the body 105. The plane E-E divides the inner surface 105 of the body 101 into the first and second semicircular portions 181, 182

Specifically, each of the first and second semicircular portions 181, 182 of the body 101 form a 180° portion of the inner surface 105 of the body 101 so that collectively the first and second semicircular portions 181, 182 of the body 101 form the entire 360° of the inner surface 105 of the body 101. In that regard, the first and second semicircular portions 181, 182 of the inner surface 105 of the body 101 do not overlap one another. The inner surface 105 of the body 101 comprises a first alignment feature 183, a second alignment feature 184, and a third alignment feature 185. In the exemplified embodiment, each of the first, second, and third alignment features 183, 184, 185 comprises one of the channels 109 described previously. Of course, the invention is not to be so limited and each of the first, second, and third alignment features 183, 184, 184 may be formed by a ridge, rib, protrusion, or the like in other embodiments so long as it ensures proper alignment of the tracking module 200 when the tracking module 200 is being inserted into the internal cavity 107 of the body 101 as described herein.

In the exemplified embodiment, the first alignment feature 183 is located along the first semicircular portion 181 of the inner surface 105 of the body 101 and the second and third alignment features 184, 185 are located along the second semicircular portion 182 of the inner surface 105 of the body 101. In the exemplified embodiment, an entirety of the second and third alignment features 184, 185 is located along the second semicircular portion 182 of the inner surface 105 of the body 101. In an alternative embodiment, a majority of the second and third alignment features 184, 185 may be located along the second semicircular portion 182. What this means is more than one-half of the length of the second and third alignment features 184, 185 would be located within the second semicircular portion 182 while the remaining portion of the second and third alignment features 184, 185 would be located within the first semicircular portion 181.

In the exemplified embodiment, due to the locations of the alignments features 183, 184, 185, the inner surface 105 of the body 101 is asymmetrical about the plane E-E that is parallel to the longitudinal axis A-A of the body 101 and intersects the opposing lateral sides of the body 101. Furthermore, the inner surface 105 of the body 101 may be symmetrical about a plane F-F that is parallel to the longitudinal axis A-A of the body 101 and intersects the front and rear surfaces 116, 117 of the body 101.

The structure of inner surface 105 of the body 101 of the oral care implement 100 will now be described in terms of its transverse cross-sectional profile, as illustrated in FIG. 10. Specifically, the inner surface 105 of the body 101 comprises a first concave portion 191, a second concave portion 192, a third concave portion 193, a first channel 194, a second channel 195, and a third channel 196. The first and second concave portions 191, 192 are separated by the first channel 194, the second and third concave portions 192, 193 are separated by the second channel 195, and the third and first concave portions 193, 191 are separated by the third channel 196. The first concave portion 191, the second concave portion 192, and the first channel 194 form the first semicircular portion 181 of the inner surface 105 of the body 101 and the third concave portion 193, the second channel 195, and the third channel 196 form the second semicircular portion 182 of the inner surface 105 of the body 101. In this embodiment, the third concave portion 193 is longer than each of the first and second concave portions 191, 192 and therefore forms a greater portion/percentage of the inner surface 105 of the body 101 than the first and second concave portions 191, 192. As seen in FIG. 10, the transverse cross-sectional profile of the inner surface 105 of the body 101 is asymmetrical about the plane E-E that is parallel to the longitudinal axis A-A of the body 101 and intersects first and second lateral sides of the body 101 and symmetrical about the plane F-F that is parallel to the longitudinal axis A-A of the body 101 and intersects the front surface 116 and the rear surface 117 of the body 101.

Once the tracking module 200 is positioned within the internal cavity 107 of the body 101, the electronics portion 250 of the tracking module 200 is prevented from rotating relative to the body 109 due to the engagement between the alignment ridges 265 of the chassis 251 of the electronics portion 250 of the tracking module 200 and the alignment channels 109 formed into the inner surface 105 of the body 101 of the oral care implement 100. Thus, even if a person were to attempt to rotate the electronics portion 250 of the tracking module 200 relative to the body 101, it would not be possible. Specifically, if one were to attempt to rotate the electronics portion 250 clockwise, a wall 266 of a first one of the alignment ridges 265 would engage a wall 118 of a first one of the alignment channels 109 to prevent such clockwise rotation of the electronics portion 250 of the tracking module 200. If one were to attempt to rotate the electronics portion counter-clockwise, a wall 267 of a second one of the alignment ridges 265 would engage a wall 119 of a second one of the alignment channels 109 to prevent such counter-clockwise rotation of the electronics portion 250 of the tracking module 200.

Thus, the electronics portion 250 of the tracking module 200 is configured to be positioned within the internal cavity 107 of the body 101 in a single orientation. It is not possible to position the electronics portion 250 of the tracking module 200 in the internal cavity 107 in any orientation other than the single orientation. Furthermore, it is not possible to rotate the electronics portion 250 of the tracking module 200 relative to the body 101 when the electronics portion 250 of the tracking module 200 is positioned within the internal cavity 107 of the body 101. Thus, the alignment channels 109 and the alignment ridges 265 operate to ensure proper alignment of the electronics portion 250 of the tracking module 200 relative to the body 101 of the oral care implement 100 and to maintain the electronics portion 250 of the tracking module 200 in the single acceptable orientation. The alignment channels 109 and the alignment ridges 265 may also be referred to herein as anti-rotation channels and anti-rotation ridges because they prevent rotation of the electronics portion 250 of the tracking module 200 while the tracking module 200 is positioned within the internal cavity 107 of the body 101 of the oral care implement 100.

Figure 11:
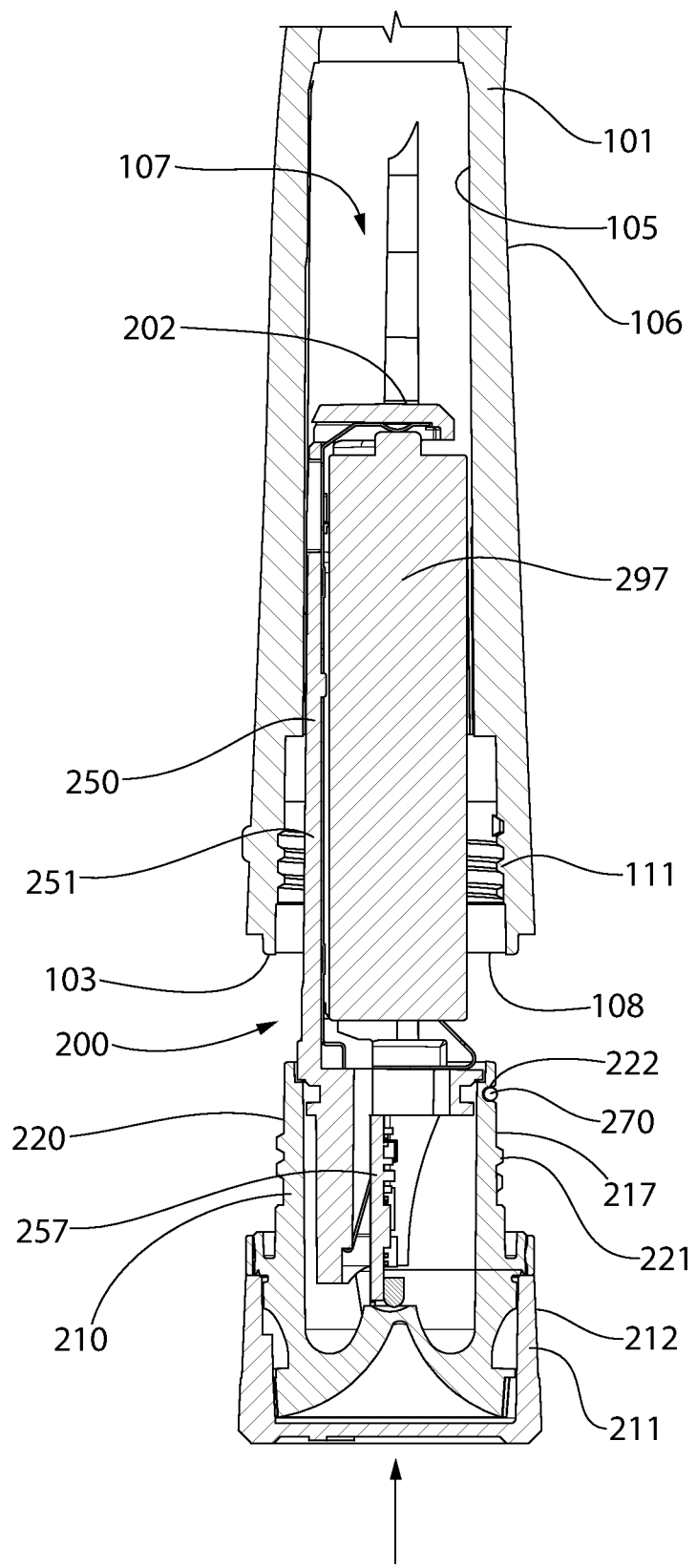
FIG. 11 is a schematic cross-sectional view illustrating the tracking module being inserted into an internal cavity of the oral care implement.
Figure 12:
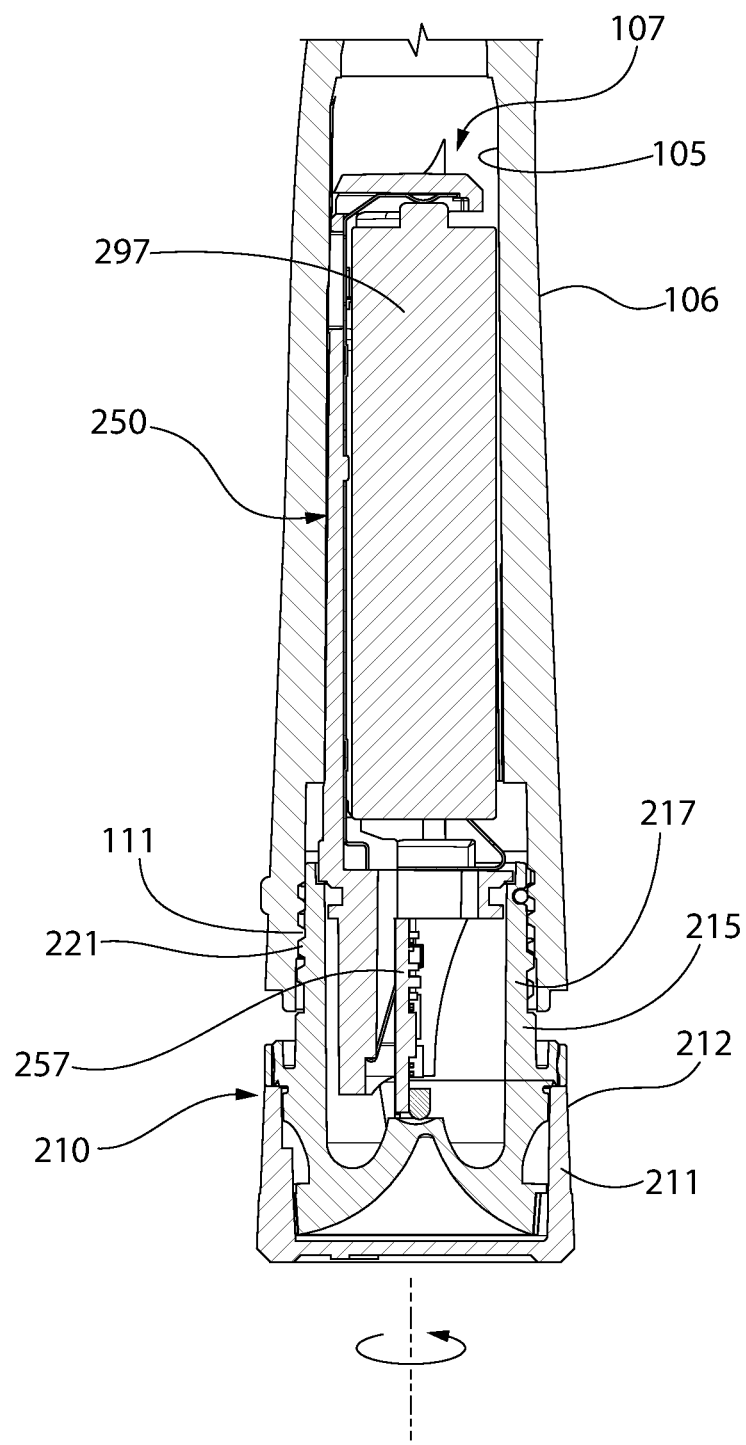
FIG. 12 is a schematic cross-sectional view illustrating the tracking module fully inserted within the internal cavity of the oral care implement prior to coupling the coupling portion of the tracking module to the oral care implement.
Figure 13:
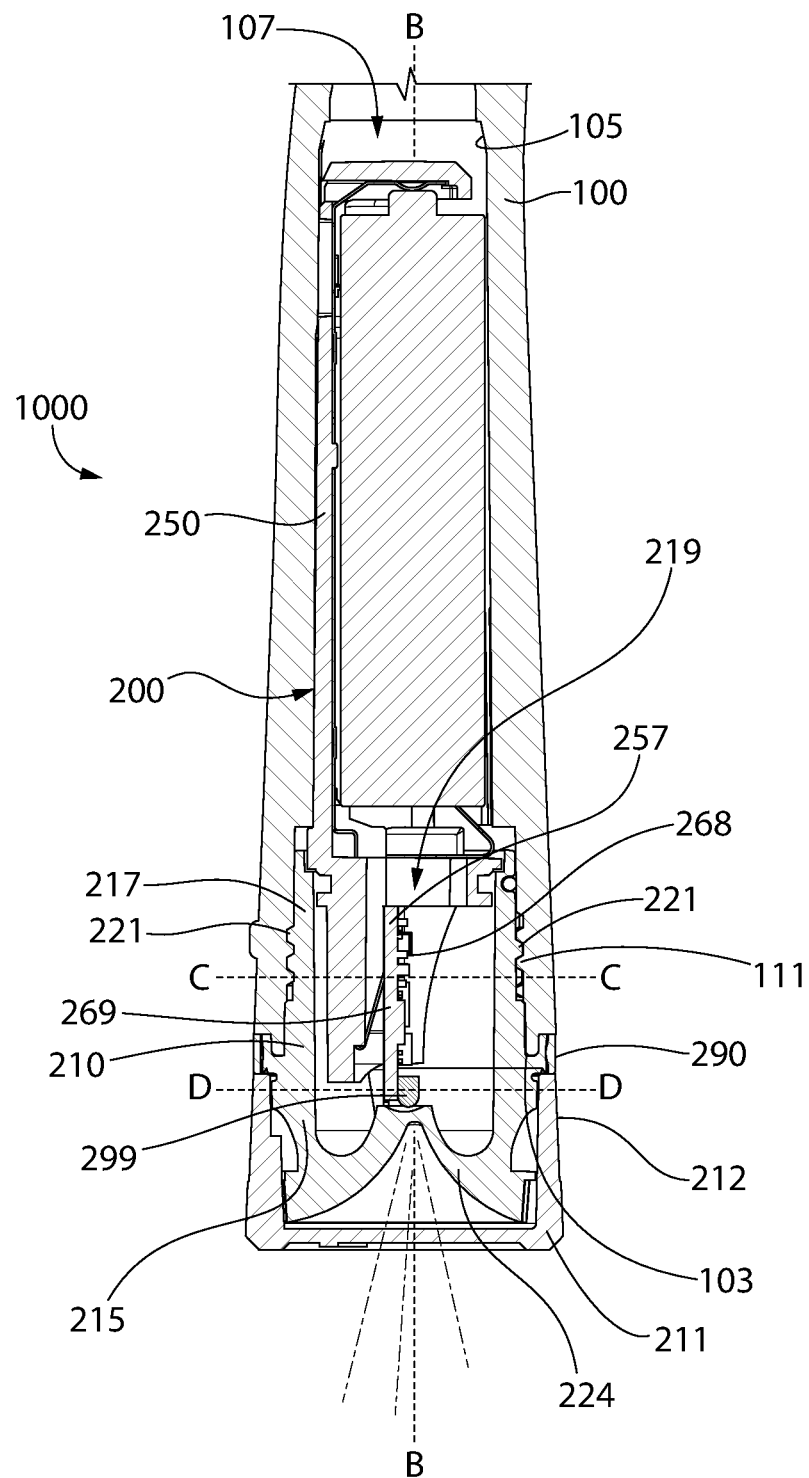
FIG. 13 is a close-up view of area XIII of FIG. 5 illustrating the tracking module coupled to the oral care implement with an illumination source of the tracking module illuminated.

Turning now to FIGS. 11-13, the process of assembling the oral care apparatus 1000 by inserting the tracking module 200 into the internal cavity 107 of the oral care implement 100 and coupling the tracking module 200 to the body 101 of the oral care implement 100 will be described. First, the alignment ridges 265 of the electronics portion 250 of the tracking module 200 are aligned with the alignment channels 109 of the body 101. Next, the first end 202 of the tracking module 200 is inserted through the opening 108 in the proximal end 103 of the body 101 and into the internal cavity 107. The tracking module 200 is continued to be moved into the internal cavity 107 by translating the tracking module 200 relative to the body 101 in a direction of the longitudinal axis A-A until it can no longer be translated (see FIG. 12).

As noted previously, the outer surface 220 of the neck portion 217 of the coupling portion 210 of the tracking module 200 comprises a first connection feature 221 thereon which in the exemplified embodiment comprises first screw threads. Furthermore, the inner surface 105 of the body 101 of the oral care implement 100 comprises a second connection feature 111 thereon which in the exemplified embodiment comprises second screw threads. The second connection feature 111 is located adjacent to the proximal end 103 of the body 101 of the oral care implement 100. Stated another way, the second screw threads are located closely adjacent to the opening 108 at the proximal end 103 of the body 101 with only a small space between the proximal end 103 and the beginning of the second screw threads. During insertion of the electronics portion 250 of the tracking module 200 into the internal cavity 107 of the body 101 of the oral care implement 100, as soon as the first screw threads of the first connection feature 221 of the tracking module 200 abut against the second screw threads of the second connection feature 111 of the body 101, the tracking module 200 can no longer be moved into the internal cavity 107 simply by translating the tracking module 200 in the direction of the longitudinal axis A-A. The abutment between the first and second screw threads of the first and second connection features 221, 111 is illustrated in FIG. 12.

Once translation of the tracking module 200 is stopped as noted above, the alignment ridges 265 of the electronics portion 250 of the tracking module 200 are nesting within the alignment channels 109 of the body 101 of the oral care implement 100. As a result, when the tracking module 200 is in this position relative to the body 101 of the oral care implement 100 (see FIG. 12), the electronics portion 250 of the tracking module 200 is prevented from rotating relative to the body 101 of the oral care implement 100. This is to ensure that the electronics portion 250 of the tracking module 200, and more specifically the sensors thereon, remain in the proper predetermined orientation relative to the body 101 of the oral care implement 100 at all times during use.

At this point in the assembly process, the coupling portion 210 of the tracking module 200 is rotated relative to the body 101 of the oral care implement 100 (and relative to the electronics portion 250 of the tracking module 200, which is prevented from rotating as described herein) to mate or engage the first screw threads of the first connection feature 221 with the second screw threads of the second connection feature 111. Specifically, rotating the coupling portion 210 of the tracking module 200 will automatically cause the first and second screw threads of the first and second connection features 221, 111 to engage one another, thereby coupling the tracking module 200 to the body 101 of the oral care implement 100. FIG. 13 illustrates the oral care apparatus 1000 with the tracking module 200 fully coupled to the oral care implement 100.

Each time that the tracking module 200 is coupled to the oral care implement 100, the sensors 296 are in the exact same location and orientation relative to the body 101, and more specifically relative to the tooth cleaning elements 115. Specifically, the sensors 296 are in the exact same axial position and the exact same circumferential position. Thus, the sensors 296 are located in the exact same place any time that the tracking module 200 is coupled to the oral care implement 100. If there is an accelerometer and a magnetometer, the accelerometer is always in the same exact location and the magnetometer is always in the exact same location when the tracking module 200 is coupled to the oral care implement. This is to ensure that the measurements being taken by those sensors 296 are consistent and accurate during each usage of the oral care apparatus 1000.

As noted previously, while the coupling portion 210 of the tracking module 200 is being rotated relative to the body 101, the electronics portion 250 of the tracking module 200 does not and can not rotate relative to the body 101. Rather, due to the interaction between the alignment ridges 265 and the alignment channels 109, the electronics portion 250 is held in place without rotating. Thus, when at least a portion of the electronics portion 250 of the tracking module 200 is located within the internal cavity 107 of the body 101 of the oral care implement 100, the electronics portion 250 of the tracking module 200 is non-rotatable relative to the body 101 of the oral care implement 100 while the coupling portion 210 of the tracking module 200 is rotatable relative to the body 101 of the oral care implement 100 to couple the tracking module 200 to the body 101 of the oral care implement 100. Stated another way, the electronics portion 250 of the tracking module 200 is prohibited from rotating relative to the body 101 during rotation of the coupling portion 210 of the tracking module 200. Thus, during rotation of the coupling portion 210 to engage the first and second screw threads, the coupling portion 210 rotates relative to the body 101 of the oral care implement 100 and relative to the electronics portion 250.

Although the first and second connection features 221, 111 are illustrated and described herein as being screw threads, the invention is not to be so limited in all embodiments. Rather, other structural components may be used that permit rotation of the coupling portion 210 relative to the body 101 to result in the tracking module 200 being coupled to the body 100. Specifically, the coupling portion 210 of the tracking module 200 and the body 101 of the oral care implement 100 may have other mating structures that interact and engage each other upon rotation of the coupling portion 210 relative to the body 101. For example, a protrusion on the coupling portion 210 of the tracking module 200 may engage a notch on the body 101 of the oral care implement 100 such as, for example, via an interference fit. The rotation of the coupling portion 210 may not result in translation of the tracking module 200 into the cavity 107 (as it does with the screw thread engagement of the exemplified embodiment), but it may instead simply lock the tracking module 200 in place. Variations to this are possible and would be appreciated by persons skilled in the art.

As noted above, the electronics portion 250 of the tracking module 200 can only be positioned within the internal cavity 107 of the body 101 of the oral care implement 100 in a single orientation relative to the body 101. This is due to the location of the alignment ridges 265 on the chassis 251 and the alignment channels in the inner surface 105 of the body 101. It is important to maintain the electronics portion 250 of the tracking module 200 in the same orientation relative to the body 101 at all times to ensure that the measurements being taken by the sensors of the electronics portion 250 of the tracking module 200 are consistent and accurate. Specifically, in some embodiments the tracking module 200 is configured to measure the position or orientation of the oral care implement 100 during toothbrushing. If the sensors that are measuring the position or orientation of the oral care implement 100 may be located in different orientations relative to the body 101 of the oral care implement 100, different measurements will be sensed. Thus, each time that the tracking module 200 is coupled to the body 101, the sensors must be oriented in the same manner in order to ensure consistency among the measurements taken by the sensors.

Referring to FIGS. 5 and 13, in the exemplified embodiment the printed circuit board 257 has a front surface 268 and an opposite rear surface 269. The electronic components including the at least one sensor 296 are located on the front surface 268 of the printed circuit board 257. In the exemplified embodiment, in the single and only orientation that the electronics portion 250 of the tracking module 200 is permitted to be placed within the internal cavity 107 of the body 101, the front surface 268 of the printed circuit board 257 and the front surface 121 of the head 120 (from which the tooth cleaning elements 115 extend) face the same direction. Of course, other possibilities exist such as the rear surface 269 of the printed circuit board 257 and the front surface 121 of the head 120 facing the same direction. It may merely be important in some embodiments that the printed circuit board 257, and hence also the sensors thereon, are positioned within the internal cavity 107 of the body 101 in the same orientation each time that the tracking module 200 is coupled to the body 101 of the oral care implement 100 regardless of what that specific orientation may be.

When the oral care apparatus 1000 is in the attached state as shown in FIGS. 5 and 13, the tracking module 200 is coupled to the oral care implement 100 with the printed circuit board 257 located adjacent to the proximal end 103 of the body 101 of the oral care implement 100 and the power source 297 located between the printed circuit board 257 and the distal end 104 of the body 101 of the oral care implement 100. Thus, the printed circuit board 257 and the sensors positioned thereon are located at (or closely adjacent to) the proximal end 103 of the body 101. In the exemplified embodiment, the body 101 of the oral care implement 100 has a length L1 measured between the proximal end distal ends 103, 104, and the printed circuit board 257 is located within a bottom-most one-tenth of the length L1 of the body 101.

This positioning of the printed circuit board 257, and specifically the at least one sensor 296, may be important in some embodiments to ensure accurate and consistent measurements can be taken by the sensor 296. In the exemplified embodiment, the printed circuit board 257 is located within the cavity 220 of the neck portion 217 so that the printed circuit board 257 is aligned with the first connection feature 221. Stated another way, a plane C-C that is transverse to the longitudinal axis B-B of the tracking module 200 intersects the printed circuit board 257 and the first connection feature 221 (i.e., the screw threads on the neck portion 217).

Furthermore, in the exemplified embodiment, the printed circuit board 257 protrudes beyond the proximal end 103 of the body 100. Thus, there also exists a plane D-D that is transverse to the longitudinal axis B-B that intersects a portion of the printed circuit board 257 without also intersecting the body 101 of the oral care implement 100. In the exemplified embodiment, the illumination source 299 is positioned on the printed circuit board 257 at a location such that a plane transverse to the longitudinal axis B-B of the tracking module that intersects the illumination source 299 does not also intersect the body 101 of the oral care implement 100. Thus, a first portion of the printed circuit board 257 is located within the internal cavity 107 of the body 101 and a second portion of the printed circuit board 257 protrudes from the proximal end 103 of the body 101. The second portion of the printed circuit board 257 includes the illumination source 299 in the exemplified embodiment.

Furthermore, in the exemplified embodiment the end cap (i.e., the first component 211) of the coupling portion 210 is in the shape of a truncated cone having a wider diameter at the bottom end than the top end. When the tracking module 200 is coupled to the oral care implement 100, at least a portion of the electronics portion 250 of the tracking module 200 is located within the internal cavity 107 of the body 101 and at least a portion of the coupling portion 210 of the tracking module 200 protrudes from the distal end 103 of the body 101. More specifically, the first component 211 of the coupling portion 210 protrudes from the distal end 103 of the body 101. By having a truncated cone shape as shown in FIGS. 5 and 13, the second component 211 of the coupling portion 210 is configured to maintain the oral care apparatus 1000 in an upright position when the oral care apparatus 1000 is in the attached state. Specifically, if the bottom end of the first component 211 is placed upon a horizontal surface such as a desk, a sink, or the like, the oral care apparatus 1000 will be maintained in an upright orientation with the longitudinal axis A-A of the oral care implement 100 extending perpendicularly from the horizontal surface.

Furthermore, as best seen in FIG. 13, the outer surface 212 of the first component 211 of the coupling portion 210 is flush with the outer surface 106 of the body 101 of the oral care implement 100. In some embodiments, the personalization ring 290 may be located adjacent the proximal end 103 of the body 101, in which case the outer surface of the personalization ring 290 may be flush with the outer surface 106 of the body 101 of the oral care implement. This provides the oral care apparatus 100 with a seamless appearance that is aesthetically pleasing and that lacks protrusions or portions that "jut" outwardly to enhance comfort during handling and use.

Referring to FIG. 13, in this embodiment the illumination source 299 referred to above with reference to FIG. 17 is illustrated in an illuminated state. Because the coupling portion 210 of the tracking module 200 is transparent, when the illumination source 299 is illuminated, it lights up the coupling portion 210 of the tracking module 200. Due to the location of the circuit board 257 within the cavity 219 of the neck portion 217, when the illumination source 299 is illuminated, the coupling portion 210 of the tracking module 200 will light up. In certain embodiments, the illumination source 299 may comprise one or more LEDs. Alternatively, the illumination source 299 may be something other than LED, such as OLED, incandescent, fluorescent (such as compact fluorescent light or CFL), halogen, or the like. When the illumination source 299 includes one LED, it may be configured to light up in multiple different colors. When the illumination source 299 comprises multiple LEDs, each might be configured to illuminate in a different color. For example, the illumination source 299 might illuminate in a first color to indicate Bluetooth (or other wireless) connectivity with the external electronic device 300, a second color to indicate that the tracking module 200 is recording and/or otherwise tracking a toothbrushing session, a third color to indicate the status of the battery (i.e., low battery), and the like. Thus, the illumination source 299 may function as an indicator light to provide information to a user based on the color, flashing pattern, brightness, or the like at which the illumination source 299 is illuminated.

Furthermore, in the exemplified embodiment a bottom surface 224 of the second component 215 of the coupling portion 210 of the tracking module 200 forms a lens for concentrating and/or dispersing the light generated by the illumination source 299. By forming the bottom surface 224 of the second component 215 as a lens, the light from the illumination source 299 can be directed in a desired manner to ensure that it is readily seen by a user to provide the user with useful information. The illumination source 299 is placed directly adjacent to the lens as seen in FIG. 13 to facilitate proper dispersion of the light generated by the illumination source 299.

Figures 14A, 14B, 14C:
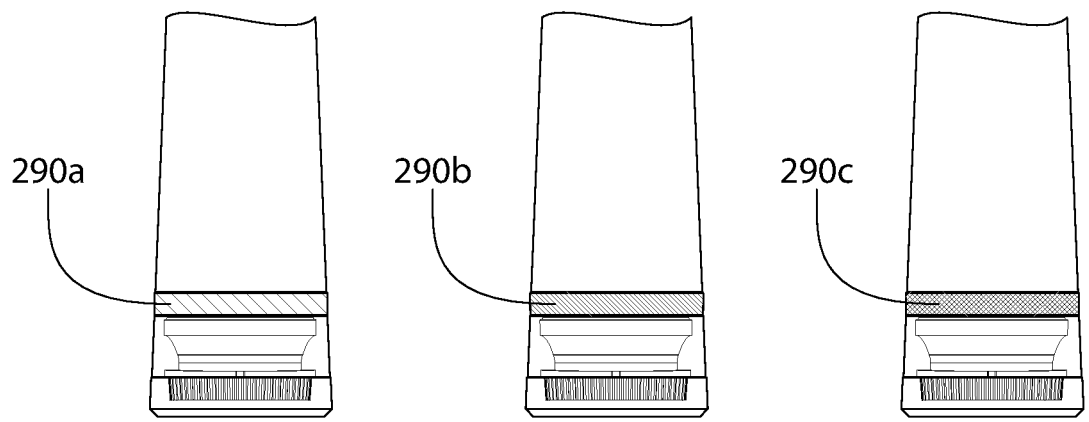
FIGS. 14A-14C are front views of a proximal portion of the oral care apparatus of FIG. 1 illustrating a personalization ring having different visual features.

Referring to FIGS. 14A-14C, a portion of the oral care apparatus 1000 is illustrated with the personalization rings 290a-290c having different styles. The personalization rings 290a-290c may have different colors, textures, patterns, materials, or the like. As discussed above, the personalization rings 290a-290c may be detachably coupled to the oral care apparatus 1000, and more specifically to the tracking module 200. As a result, a user can swap out the personalization rings 290a-290c as desired to use a particular personalization ring 290a-290c that the user most prefers based on color, pattern, material, texture, theme, or the like. The purpose of FIGS. 14A-14C is to exemplify that different personalization rings 290 may be attached to the oral care apparatus 1000 to enable quick and easy identification of which oral care apparatus 1000 belongs to which user.

Figures 16A, 16B:
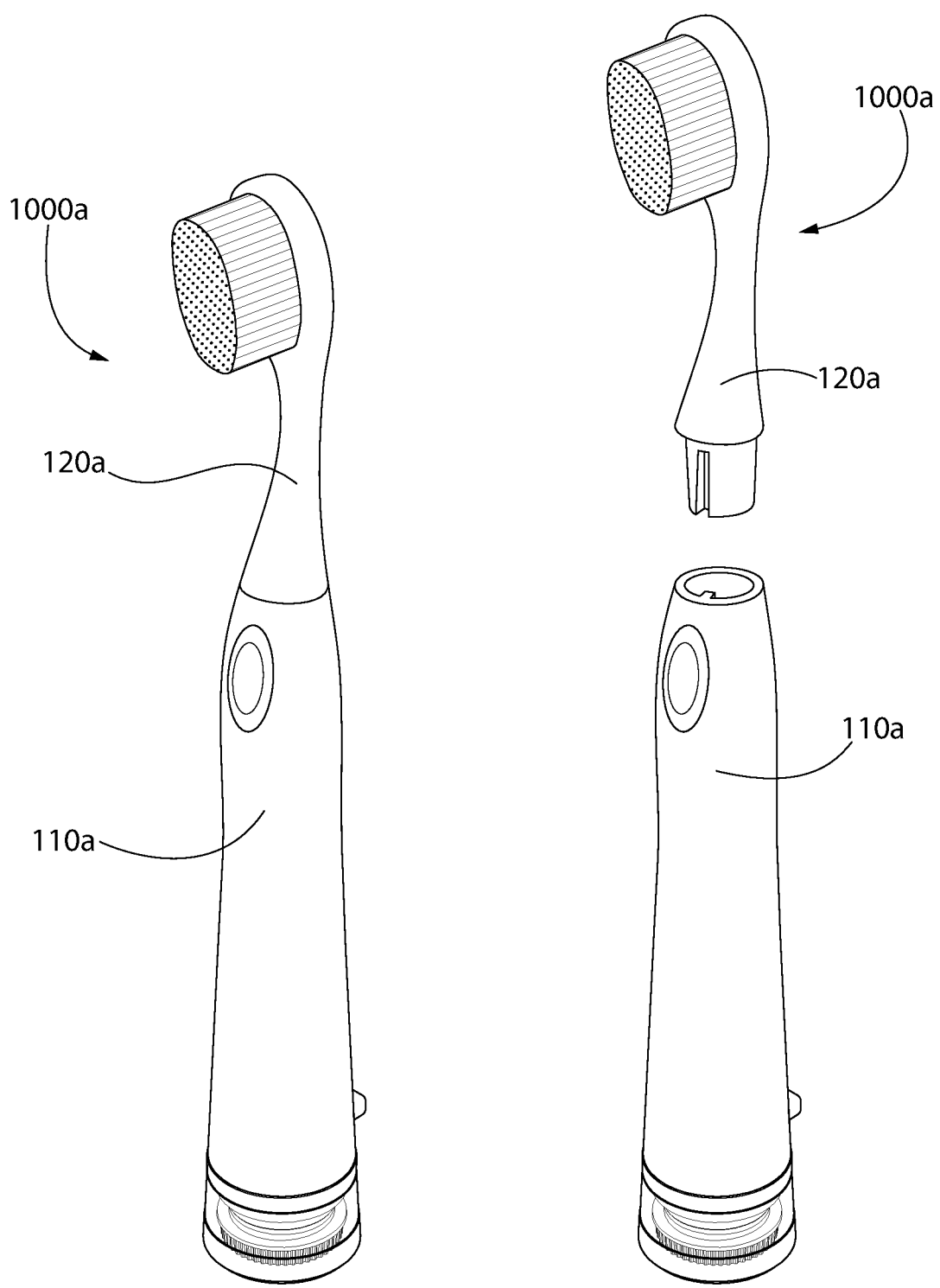
FIGS. 16A-16B are perspective views of an alternative embodiment of the oral care apparatus of FIG. 1 illustrating the oral care implement including a handle portion and a head portion that is detachable therefrom.

Referring to FIGS. 16A-16B, an alternative embodiment of an oral care apparatus 1000a is illustrated. The oral care apparatus 1000a is identical to the oral care apparatus 1000 described above except that in this embodiment the body 101a comprises a handle portion 110a and a head portion 120a that are detachable from one another. Thus, the head portion 120a in this embodiment is a refill head so that the head portion 120a can be replaced without also replacing the handle portion 110a. The handle portion 110a and the head portion 120a may include features to facilitating coupling of the two portions together.

Use of the oral care apparatus 1000 will now be described. First, a user will make sure that the tracking module 200 has a working power source 297 (i.e., battery). Next, the tracking module 200 is inserted into the cavity 107 of the body 101 of the oral care implement 100 and the tracking module 200 is coupled to the body 101 of the oral care implement 100 in the manner described in detail herein above. The oral care apparatus 1000 may be left in this attached state all the time, both during use and in between uses. Thus, the oral care apparatus 1000 may be stored in the attached state. The only reasons to alter the oral care apparatus 1000 from the attached state to the detached state are to change the power source 297 of the tracking module 200 or to attach the tracking module 200 to another oral care implement 100 when replacement of the first oral care implement 100 is required (due to splaying of the bristles, etc. oral care implements are supposed to be replaced every three months).

When a user desires to use the oral care apparatus 1000 for teeth cleaning, the user will pick up the oral care apparatus 1000, apply dentifrice or the like to the tooth cleaning elements 115, apply water to the tooth cleaning elements 115 as desired, and then insert the head 120 of the oral care implement 100 into the user's oral cavity. The user will then brush in the normal manner. The tracking module 200 may be configured to automatically power on upon detecting that the user is cleaning the oral cavity or brushing the teeth. Thus, in the exemplified embodiment neither the oral care implement 100 nor the tracking module 200 has a power button. Rather, the tracking module 200 powers on automatically upon detecting that the oral care implement 100 is being used for tooth cleaning. Upon being powered on, the tracking module 200, and more specifically the one or more sensors 296 thereof, will begin measuring the position, orientation, and/or movement of the oral care implement and generating data indicative of the position, orientation, and/or movement of the oral care implement. Of course, in other embodiments the tracking module 200 may include a power button or the like to initiate activation thereof.

The tracking module 200 may be in operable communication with an external electronic device 300 as described herein. Thus, a user may open an application on the external electronic device 300 to initiate communication between the oral care apparatus 1000 and the external electronic device 300. This can be achieved by a user opening an application on a smart phone, or the like. In such an embodiment, once communication is established between the oral care apparatus 1000 and the external electronic device 300, the data being generated by the one or more sensors 296 of the tracking module 200 may be transmitted to the external electronic device 300. This data can then be used to provide the user with real-time coaching and instant feedback regarding his or her toothbrushing technique. The display of the external electronic device 300 may display a game or other visual representation of the user's toothbrushing to indicate to the user how effectively he or she is brushing, which teeth/portions of the oral cavity have been brushed and which have not, and other information which may be desirable for a user to be presented with to enhance their oral hygiene experience and encourage proper brushing.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An oral care apparatus comprising:
an oral care implement comprising a body having an internal cavity;
a tracking module extending along a longitudinal axis, the tracking module comprising:
a coupling portion configured to couple the tracking module to the body of the oral care implement; and
an electronics portion comprising at least one sensor configured to measure at least one of a position, an orientation, and a movement of the oral care implement when the tracking module is coupled to the oral care implement;
wherein the oral care apparatus is alterable between: (1) an attached state in which the tracking module is coupled to the oral care implement with the electronics portion of the tracking module at least partially positioned within the internal cavity of the body; and (2) a detached state in which the tracking module is separated from the oral care implement; and
wherein the electronics portion of the tracking module can only be positioned within the internal cavity of the body in a single orientation relative to the body; and
wherein the electronics portion of the tracking module comprises a chassis having an outer surface and wherein the body of the oral care implement comprises an inner surface that defines the internal cavity, and further comprising a plurality of alignment ridges formed into one of the outer surface of the chassis or the inner surface of the body of the oral care implement and a plurality of alignment channels formed into the other one of the outer surface of the chassis or the inner surface of the body of the oral care implement, and wherein the plurality of alignment ridges of the one of the outer surface of the chassis or the inner surface of the body of the oral care implement nest within the plurality of alignment channels of the other one of the outer surface of the chassis or the inner surface of the body of the oral care implement when the tracking module is coupled to the oral care implement.

2. The oral care apparatus according to claim 1 wherein the electronics portion of the tracking module and the coupling portion of the tracking module are coupled together so as to be freely rotatable about the longitudinal axis relative to one another while being fixed relative to one another in an axial direction.

3. The oral care apparatus according to claim 1 wherein the electronics portion of the tracking module is prevented from being positioned within the internal cavity of the body of the oral care implement in any orientation relative to the body other than the single orientation.

4. The oral care apparatus according to claim 1 wherein when the electronics portion of the tracking module is at least partially positioned within the internal cavity of the body, the electronics portion of the tracking module is non-rotatable relative to the body.

5. The oral care apparatus according to claim 1 wherein in the attached state of the oral care implement, the coupling portion of the tracking module is rotatable relative to the body of the oral care implement and relative to the electronics portion of the tracking module.

6. The oral care apparatus according to claim 5 wherein rotating the coupling portion of the tracking module in a first rotational direction engages a first connection feature of the coupling portion of the tracking module with a second connection feature of the body of the oral care implement, and wherein rotating the coupling portion of the tracking module in a second rotational direction that is opposite the first rotational direction disengages the first connection feature of the coupling portion of the tracking module from the second connection feature of the body of the oral care implement.

7. The oral care apparatus according to claim 6 wherein one of the first and second connection features comprises first screw threads and the other of the first and second connection features comprises second screw threads that mate with the first screw threads, the tracking module being coupled to the oral care implement by inserting at least a portion of the electronics portion of the tracking module into the internal cavity of the body and then rotating the coupling portion of the tracking module relative to the body in the first rotational direction so that the first and second screw threads engage one another.

8. The oral care apparatus according to claim 1 wherein the plurality of alignment ridges and the plurality of alignment channels maintain the electronics portion of the tracking module in the single orientation relative to the body of the oral care implement, and wherein the coupling portion of the tracking module rotates relative to the electronics portion of the tracking module and the body of the oral care implement for coupling the tracking module to the body of the oral care implement.

9. The oral care apparatus according to claim 1 further comprising:
the body of the oral care implement comprising a handle and a head;
a plurality of tooth cleaning elements extending from a front surface of the head;
the electronics portion of the tracking module comprising a printed circuit board having the at least one sensor coupled thereto and a power source operably coupled to the at least one sensor, the at least one sensor located on a front surface of the printed circuit board; and
wherein in the single orientation the front surface of the printed circuit board and the front surface of the head face the same direction.

10. An oral care apparatus comprising:
an oral care implement comprising a body having an internal cavity, the body extending along a longitudinal axis from a proximal end to a distal end;
a tracking module comprising:
a coupling portion configured to couple the tracking module to the body of the oral care implement; and
an electronics portion comprising a power source and a printed circuit board having at least one sensor thereon, the at least one sensor configured to measure at least one of a position, an orientation, and a movement of the oral care implement when the tracking module is coupled to the oral care implement;
wherein the oral care apparatus is alterable between: (1) an attached state in which the tracking module is coupled to the oral care implement with the electronics portion of the tracking module at least partially positioned within the internal cavity of the body; and (2) a detached state in which the tracking module is completely separated from the oral care implement; and
wherein in the attached state the printed circuit board is located adjacent to the proximal end of the body of the oral care implement and the power source is located between the printed circuit board and the distal end of the body of the oral care implement;
wherein the electronics portion of the tracking module comprises a chassis having a first portion forming a first compartment that retains the power source and a second portion forming a second compartment that retains the printed circuit board; and
wherein the chassis of the electronics portion of the tracking module comprises an annular groove located between the first and second portions, and further comprising a locking element coupled to the coupling portion of the tracking module that at least partially nests within the annular groove of the chassis to prevent relative axial movement between the coupling portion and the electronics portion of the tracking module while permitting relative rotational movement between the coupling portion and the electronics portion of the tracking module.

11. The oral care apparatus according to claim 10 wherein the electronics portion and the coupling portion are coupled together so as to be freely rotatable relative to one another about the longitudinal axis while being substantially fixed relative to one another in an axial direction.

12. The oral care apparatus according to claim 10 wherein the body of the oral care implement extends along a length, and wherein the printed circuit board is located within a bottom-most one-tenth of the length of the body.

13. The oral care apparatus according to claim 10 wherein the coupling portion of the tracking module comprises an end cap and a neck portion extending from the end cap, the neck portion having an inner surface that defines a cavity, and wherein the printed circuit board of the electronics portion is located within the cavity of the neck portion of the coupling portion of the tracking module.

14. The oral care apparatus according to claim 13 wherein an outer surface of the neck portion of the coupling portion of the tracking module comprises a first connection feature that mates with a second connection feature on the inner surface of the body to couple the tracking module to the body, and wherein in the attached state the neck portion of the coupling portion of the tracking module is located within the internal cavity of the body of the oral care implement and the end cap of the coupling portion of the tracking module protrudes from the proximal end of the body of the oral care implement.

15. The oral care apparatus according to claim 10 wherein the oral care implement is free of any electronic components.

16. The oral care apparatus according to claim 10 wherein the tracking module is configured to communicate with an external electronic device to send data indicative of at least one of the position, the orientation, and the movement of the oral care implement to the external electronic device during toothbrushing.

17. An oral care apparatus comprising:
an oral care implement comprising a body having an internal cavity;
a tracking module extending along a longitudinal axis, the tracking module comprising:
a coupling portion configured to couple the tracking module to the body of the oral care implement; and
an electronics portion comprising at least one sensor configured to measure at least one of a position, an orientation, and a movement of the oral care implement when the tracking module is coupled to the oral care implement;
wherein the oral care apparatus is alterable between: (1) an attached state in which the tracking module is coupled to the oral care implement with the electronics portion of the tracking module at least partially positioned within the internal cavity of the body; and (2) a detached state in which the tracking module is separated from the oral care implement; and wherein the electronics portion of the tracking module can only be positioned within the internal cavity of the body in a single orientation relative to the body;

wherein in the attached state of the oral care implement, the coupling portion of the tracking module is rotatable relative to the body of the oral care implement and relative to the electronics portion of the tracking module; and wherein rotating the coupling portion of the tracking module in a first rotational direction engages a first connection feature of the coupling portion of the tracking module with a second connection feature of the body of the oral care implement, and wherein rotating the coupling portion of the tracking module in a second rotational direction that is opposite the first rotational direction disengages the first connection feature of the coupling portion of the tracking module from the second connection feature of the body of the oral care implement.

18. The oral care apparatus according to claim 17 wherein one of the first and second connection features comprises first screw threads and the other of the first and second connection features comprises second screw threads that mate with the first screw threads, the tracking module being coupled to the oral care implement by inserting at least a portion of the electronics portion of the tracking module into the internal cavity of the body and then rotating the coupling portion of the tracking module relative to the body in the first rotational direction so that the first and second screw threads engage one another.

\* \* \* \* \*